(12) United States Patent
Xu et al.

(10) Patent No.: US 12,177,865 B2
(45) Date of Patent: Dec. 24, 2024

(54) DATA TRANSMISSION METHOD AND APPARATUS

(71) Applicant: Huawei Technologies Co., Ltd., Shenzhen (CN)

(72) Inventors: Xiuqiang Xu, Shanghai (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 388 days.

(21) Appl. No.: 17/709,113

(22) Filed: Mar. 30, 2022

(65) Prior Publication Data

US 2022/0225395 A1    Jul. 14, 2022

Related U.S. Application Data

(63) Continuation of application No. PCT/CN2019/109714, filed on Sep. 30, 2019.

(51) Int. Cl.
*H04W 72/23* (2023.01)
*H04W 72/04* (2023.01)
*H04W 72/50* (2023.01)

(52) U.S. Cl.
CPC .......... *H04W 72/23* (2023.01); *H04W 72/04* (2013.01); *H04W 72/50* (2023.01)

(58) Field of Classification Search
CPC . H04W 72/12; H04W 72/1289; H04W 24/00; H04W 28/00; H04W 72/04; H04W 72/50; H04L 47/76; H04L 47/78
See application file for complete search history.

(56) References Cited

U.S. PATENT DOCUMENTS

| 2010/0002638 A1* | 1/2010 | Park ..................... H04W 72/23 |
| | | 370/329 |
| 2011/0063975 A1* | 3/2011 | Ohseki ............... H04W 72/535 |
| | | 370/230.1 |

(Continued)

FOREIGN PATENT DOCUMENTS

| CN | 107734651 A | 2/2018 |
| CN | 108347779 A | 7/2018 |

(Continued)

OTHER PUBLICATIONS

"Discussion on transmission in preconfigured UL resources for NB-IOT," 3GPP TSG RAN WG1 Meeting #94bis, Chengdu, China, R1-1810828, XP051518233, Total 4 pages, 3rd Generation Partnership Project, Valbonne, France (Oct. 8-12, 2018).

*Primary Examiner* — Warner Wong
(74) *Attorney, Agent, or Firm* — Leydig, Voit & Mayer, Ltd.

(57) ABSTRACT

A data transmission method and apparatus to reduce terminal power consumption and ensure transmission reliability during uplink data transmission is provided. The method includes: A terminal transmits first uplink data to a network device on a non-dynamically scheduled resource. The terminal receives response information for the first uplink data from the network device, where the response information is used to indicate whether the first uplink data is successfully received. The response information is further used to indicate whether the terminal monitors a physical downlink control channel PDCCH under a configured condition. If the response information indicates the terminal not to monitor the PDCCH under the configured condition, the response information may be further used to indicate to transmit second uplink data by using the non-dynamically scheduled resource under the configured condition.

19 Claims, 9 Drawing Sheets

(56) References Cited

U.S. PATENT DOCUMENTS

| | | | | |
|---|---|---|---|---|
| 2013/0142144 A1* | 6/2013 | Kim | ................ | H04L 5/0048 |
| | | | | 370/329 |
| 2015/0181571 A1* | 6/2015 | Park | ................ | H04W 52/0216 |
| | | | | 370/252 |
| 2016/0143048 A1* | 5/2016 | Lee | ................ | H04W 72/12 |
| | | | | 370/336 |
| 2018/0139774 A1 | 5/2018 | Ma et al. | | |
| 2018/0167919 A1* | 6/2018 | Kim | ................ | H04W 72/23 |
| 2018/0324839 A1* | 11/2018 | Feng | ................ | H04W 72/21 |
| 2020/0052857 A1* | 2/2020 | Xu | ................ | H04W 76/27 |
| 2020/0177322 A1* | 6/2020 | Xu | ................ | H04L 1/1819 |
| 2021/0400703 A1* | 12/2021 | Baldemair | ................ | H04W 72/23 |
| 2022/0053530 A1* | 2/2022 | Ahmed | ................ | H04W 72/12 |
| 2022/0104124 A1* | 3/2022 | Shah | ................ | H04W 72/1263 |

FOREIGN PATENT DOCUMENTS

| | | |
|---|---|---|
| CN | 109391372 A | 2/2019 |
| CN | 110035481 A | 7/2019 |
| CN | 110521271 A | 11/2019 |
| CN | 110537390 A | 12/2019 |
| WO | 2013172756 A1 | 11/2013 |
| WO | 2018028271 A1 | 2/2018 |
| WO | 2018057142 A1 | 3/2018 |
| WO | 2019005920 A1 | 1/2019 |

* cited by examiner

DATA TRANSMISSION METHOD AND APPARATUS

CROSS-REFERENCE TO RELATED APPLICATIONS

This application is a continuation of International Application No. PCT/CN2019/109714, filed on Sep. 30, 2019, the disclosure of which is hereby incorporated by reference in its entirety.

TECHNICAL FIELD

This application relates to the field of communication technologies, and in particular, to a data transmission method and apparatus.

BACKGROUND

In a cellular network mobile communication system, manners for uplink data transmission include dynamic grant-based (GB) or dynamic scheduling-based data transmission, and non-dynamic scheduling-based data transmission. The non-dynamic scheduling-based data transmission includes semi-persistent scheduling (SPS) or grant-free (GF) data transmission. A process of the dynamic grant-based (GB) or dynamic scheduling-based data transmission includes: When a terminal has a requirement for uplink data transmission, the terminal usually reports a non-empty buffer status report (BSR) to a base station. The base station sends downlink control information (DCI) to the terminal, where the DCI carries an uplink grant (UL grant). During dynamic scheduling, real-time channel information between the terminal and the base station may be efficiently used, and an appropriate location and size of a time-frequency resource, an appropriate transmission parameter, and the like are specified for each time of transmission of the terminal. Therefore, the dynamic scheduling-based uplink transmission usually has higher reliability.

A process of the non-dynamic scheduling-based data transmission includes: Abase station configures, for a terminal in a semi-static manner by using higher layer signaling and/or physical layer signaling, a time-frequency resource, a transmission parameter, and the like used for uplink data transmission. When the terminal has a requirement for uplink data transmission, the terminal directly sends data to the base station by using the semi-statically configured time-frequency resource and transmission parameter, instead of performing a process of sending an SR or a BSR to the base station and waiting for an uplink grant. In this way, data is transmitted in an arrive-and-go manner, thereby reducing a transmission delay, signaling overheads, and terminal power consumption.

SUMMARY

This application provides a data transmission method and apparatus, to reduce terminal power consumption and ensure transmission reliability during uplink data transmission.

According to a first aspect, a data transmission method is provided. The method may be implemented by using the following steps: A terminal transmits first uplink data to a network device on a non-dynamically scheduled resource. The terminal receives response information for the first uplink data from the network device, where the response information is used to indicate whether the first uplink data is successfully received. The response information is further used to indicate whether the terminal monitors a physical downlink control channel (PDCCH) under a configured condition. If the response information indicates the terminal not to monitor the PDCCH under the configured condition, the response information may be further used to indicate to transmit second uplink data by using the non-dynamically scheduled resource under the configured condition. Monitoring of the PDCCH may be considered that the terminal uses dynamic scheduling-based uplink transmission. Transmission of the first uplink data on the non-dynamically scheduled resource may be considered that terminal performs uplink transmission in a non-dynamic scheduling manner. In this case, on the basis that uplink transmission is performed in the non-dynamic scheduling manner, the response message is used to indicate an uplink transmission manner to be used by the terminal subsequently, and may be used to indicate the terminal to perform uplink transmission in the non-dynamic scheduling manner or a dynamic scheduling manner. The uplink transmission manner of the terminal can be dynamically indicated. For example, the uplink transmission manner of the terminal may be indicated based on a requirement of the terminal or a condition of a channel in which the terminal is currently located. Both better reliability performance of the dynamic scheduling-based uplink transmission and performance of a lower transmission delay, lower signaling overheads, and reducing terminal power consumption of non-dynamic scheduling-based uplink transmission are considered, and dual objectives of achieving high reliability and a low delay are compatible. In this way, a waste of power consumption caused by the terminal needing to monitor the PDCCH all the time when the terminal does not obtain an indication of the response information is avoided. Through the indication of the response information, the terminal monitors the PDCCH only when the terminal needs to monitor the PDCCH and does not monitor the PDCCH when the terminal does not need to monitor the PDCCH, thereby saving terminal power consumption.

The non-dynamic scheduling-based uplink transmission may also be referred to as grant-free (GF) uplink transmission, SPS uplink transmission, scheduling-free uplink transmission, dynamic scheduling-free uplink transmission, dynamic grant-free uplink transmission, uplink transmission with a configured grant (uplink transmission with a configured grant), or higher layer configuration.

In an embodiment, the response information is used to indicate the terminal to monitor a physical downlink control channel (PDCCH) under a configured condition, and the terminal determines, based on the response information, to monitor the PDCCH under the configured condition. The PDCCH is used to schedule uplink data transmission.

In an embodiment, the response information is further used to indicate the terminal to transmit second uplink data by using the non-dynamically scheduled resource under the configured condition. The terminal determines, based on the response information, to transmit the second uplink data by using the non-dynamically scheduled resource under the configured condition. Transmission of the second uplink data by using the non-dynamically scheduled resource may be understood as follows: For example, the non-dynamically scheduled resource may be periodic, the first uplink data is transmitted in one periodicity, and the second uplink data is transmitted in a next periodicity.

The response information for the first uplink data may alternatively be feedback information for the first uplink data. For example, the response information may be hybrid automatic repeat request (HARQ) feedback information.

The response information may further include the HARQ feedback information and other indication information.

In an embodiment, the configured condition may be: in a time window, for example, in specific duration. In this case, that the terminal determines, based on the response information, to monitor the PDCCH under the configured condition may be understood as: The terminal determines, based on the response information, to monitor the PDCCH in the time window. That the terminal determines, based on the response information, to transmit the second uplink data by using the non-dynamically scheduled resource under the configured condition may be understood as: The terminal determines, based on the response information, to transmit the second uplink data by using the non-dynamically scheduled resource in the time window. By indicating the terminal to monitor the PDCCH or transmit the second uplink data by using the non-dynamically scheduled resource in the time window, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource.

In an embodiment, the response information includes indication information of the time window. Optionally, the indication information of the time window may further be separately sent. For example, the indication information of the time window may be carried in an RRC message, a MAC CE, or DCI. The indication information of the time window may be used to indicate a start moment, an end moment, and a length (or duration) of the time window. By indicating a time window in which an uplink transmission manner takes effect, fine-grained control is implemented, and a compromise effect among transmission reliability, terminal power consumption, and resource utilization is improved.

Optionally, the start moment of the time window includes the last symbol in which the response information is received.

In an embodiment, time window monitoring may be implemented by using a timer. For example, the terminal starts or restarts the timer in response to the response information, where timer duration of the timer is a length of the time window. If the response information is used to indicate to monitor the PDCCH, the terminal monitors the PDCCH during running of the timer; or if the response information is used to indicate to transmit the second uplink data in a non-dynamic scheduling manner, the terminal transmits the second uplink data in the non-dynamic scheduling manner during running of the timer.

In an embodiment, the configured condition may be: in M times of uplink data transmission. In this case, that the terminal determines, based on the response information, to monitor the PDCCH under the configured condition may be understood as: The terminal determines, based on the response information, to monitor the PDCCH before each of M times of uplink data transmission. That the terminal determines, based on the response information, to transmit the second uplink data by using the non-dynamically scheduled resource under the configured condition may be understood as: The terminal determines, based on the response information, to transmit the second uplink data by using the non-dynamically scheduled resource before each of M times of uplink data transmission. By indicating the terminal to monitor the PDCCH or perform the M times of uplink data transmission by using the non-dynamically scheduled resource before each of the M times of uplink data transmission, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource. By indicating that an uplink transmission manner takes effect in M times of uplink transmission, fine-grained control is implemented, and a compromise effect among transmission reliability, terminal power consumption, and resource utilization is improved.

Optionally, the response information includes M. Alternatively, the terminal receives RRC signaling, a MAC CE, or DCI from the network device, where the RRC signaling, the MAC CE, or the DCI carries M.

In an embodiment, monitoring of a quantity of times of uplink transmission may be implemented by using a counter. For example, the terminal starts or restarts the counter in response to the response information. If the response information is used to indicate to monitor the PDCCH, the terminal monitors the PDCCH in M times of uplink data transmission recorded by the counter (or before a quantity of times recorded by the counter exceeds M); or if the response information is used to indicate to transmit the second uplink data in a non-dynamic scheduling manner, the terminal transmits the second uplink data in the non-dynamic scheduling manner.

In an embodiment, each of the M times of uplink data transmission includes K times of repeated transmission of same data. K times of repetition can ensure data packet reliability. A data packet that is repeatedly transmitted for K times in one time of uplink data transmission can be retransmitted without waiting for a feedback from the network device, thereby helping to reduce a delay.

In an embodiment, the response information includes first indication information and second indication information. The first indication information is used to indicate whether the first uplink data is successfully received. For example, a first value in the first indication information is used to indicate that the first uplink data is successfully received, and a second value in the first indication information is used to indicate that the first uplink data is not successfully received. For example, the first value is an ACK, and the second value is a NACK. The second indication information is used to indicate to monitor the PDCCH under the configured condition or indicate to transmit the second uplink data in the non-dynamic scheduling manner under the configured condition.

Optionally, when the second indication information indicates an uplink data transmission manner, an implicit indication may be selected. For example, the uplink data transmission manner is implicitly indicated based on a search space (SS) type (for example, common search space or terminal-specific search space) or a control resource set (CORESET) type (for example, CORESET 0 or CORESET 1) in which a PDCCH carrying the response information is sent, a scrambled radio network temporary identifier (RNTI) type, a DCI format, or the like.

In an embodiment, the response information includes a positive acknowledgment instruction ACK, and the ACK is used to indicate that the first uplink data is successfully received and indicate to transmit the second uplink data in the non-dynamic scheduling manner under the configured condition.

In an embodiment, the response information includes a negative acknowledgment instruction NACK, and the NACK is used to indicate that the first uplink data is not successfully received and indicate to monitor the PDCCH under the configured condition.

An uplink transmission manner is implicitly indicated by using the ACK and the NACK, so that overheads can be reduced.

In an embodiment, the second uplink data is data to-be-transmitted after the first uplink data, and may be retransmitted data of the first uplink data or newly transmitted data. For example, the response information is used to indicate that the first uplink data is successfully received, and the second uplink data is newly transmitted data; or the response information is used to indicate that the first uplink data is not successfully received, and the second uplink data is retransmitted data of the first uplink data.

In an embodiment, the terminal transmits the second uplink data based on a PDCCH obtained through monitoring under the configured condition. Alternatively, if no PDCCH is monitored under the configured condition, the terminal transmits the second uplink data in the non-dynamic scheduling manner. After receiving the response information, the terminal may monitor the PDCCH based on the response information, and if the PDCCH is not monitored, the terminal may continue to transmit the second uplink data by using the non-dynamically scheduled resource, without waiting for scheduling of the PDCCH. This prevents a transmission delay from increasing because the PDCCH cannot be monitored for a long time.

In an embodiment, the terminal sends a buffer status report BSR to the network device, where the BSR indicates that the terminal buffers data. In this way, after receiving the BSR, the network device may determine, based on the BSR, to indicate a subsequent uplink data transmission manner for the terminal.

According to a second aspect, a data transmission method is provided. The method may be implemented by using the following steps: A network device receives first uplink data from a terminal. The network device sends response information for the first uplink data to the terminal, where the response information is used to indicate whether the first uplink data is successfully received, and is used to indicate an uplink transmission manner, where the uplink transmission manner may include dynamic scheduling-based uplink transmission under a configured condition or transmitting second uplink data by using a non-dynamically scheduled resource under the configured condition. Monitoring of the PDCCH may be considered that the terminal uses dynamic scheduling-based uplink transmission. Transmission of the first uplink data on the non-dynamically scheduled resource may be considered that terminal performs uplink transmission in a non-dynamic scheduling manner. In this case, on the basis that uplink transmission is performed in the non-dynamic scheduling manner, the response message is used to indicate an uplink transmission manner to be used by the terminal subsequently, and may be used to indicate the terminal to perform uplink transmission in the non-dynamic scheduling manner or a dynamic scheduling manner. The uplink transmission manner of the terminal can be dynamically indicated. For example, the uplink transmission manner of the terminal may be indicated based on a requirement of the terminal or a condition of a channel in which the terminal is currently located. Both better reliability performance of the dynamic scheduling-based uplink transmission and performance of a lower transmission delay, lower signaling overheads, and reducing terminal power consumption of non-dynamic scheduling-based uplink transmission are considered, and dual objectives of achieving high reliability and a low delay are compatible. In this way, a waste of power consumption caused by the terminal needing to monitor the PDCCH all the time when the terminal does not obtain an indication of the response information is avoided. Through the indication of the response information, the terminal monitors the PDCCH only when the terminal needs to monitor the PDCCH and does not monitor the PDCCH when the terminal does not need to monitor the PDCCH, thereby saving terminal power consumption.

Non-dynamic scheduling may also be referred to as grant-free (GF), SPS, scheduling-free, dynamic scheduling-free, dynamic grant-free, or higher layer configuration.

In an embodiment, the uplink transmission manner includes dynamic scheduling-based uplink transmission in a time window (or monitoring a PDCCH in the time window) or transmitting the second uplink data by using the non-dynamically scheduled resource in the time window. By indicating the terminal to monitor the PDCCH or transmit the second uplink data by using the non-dynamically scheduled resource in the time window, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource.

In an embodiment, the uplink transmission manner includes monitoring a physical downlink control channel PDCCH before each of M times of uplink data transmission or performing M times of uplink transmission on the second uplink data by using the non-dynamically scheduled resource. By indicating the terminal to monitor the PDCCH or transmit the second uplink data by using the non-dynamically scheduled resource in the M times of uplink data transmission, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource. By indicating that an uplink transmission manner takes effect in M times of uplink transmission, fine-grained control is implemented, and a compromise effect among transmission reliability, terminal power consumption, and resource utilization is improved.

In an embodiment, the response information includes first indication information and second indication information. The first indication information is used to indicate whether the first uplink data is successfully received. For example, a first value in the first indication information is used to indicate that the first uplink data is successfully received, and a second value in the first indication information is used to indicate that the first uplink data is not successfully received. For example, the first value is an ACK, and the second value is a NACK. The second indication information is used to indicate to monitor the PDCCH under the configured condition or indicate to transmit the second uplink data in the non-dynamic scheduling manner under the configured condition.

Optionally, when the second indication information indicates an uplink data transmission manner, an implicit indication may be selected. For example, the uplink data transmission manner is implicitly indicated based on a search space (SS) type (for example, common search space or terminal-specific search space) or a control resource set (CORESET) type (for example, CORESET 0 or CORESET 1) in which a PDCCH carrying the response information is sent, a scrambled radio network temporary identifier (RNTI) type, a DCI format, or the like.

In an embodiment, the response information includes a positive acknowledgment instruction ACK, and the ACK is used to indicate that the first uplink data is successfully received and indicate to transmit the second uplink data in a non-dynamic scheduling manner under the configured condition; or the response information includes a negative acknowledgment instruction NACK, and the NACK is used to indicate that the first uplink data is not successfully received and indicate to monitor the PDCCH under the configured condition. An uplink transmission manner is implicitly indicated by using the ACK and the NACK, so that overheads can be reduced.

In an embodiment, the network device receives a buffer status report BSR from the terminal, where the BSR indicates that the terminal buffers data. In this way, after receiving the BSR, the network device may determine, based on the BSR, to indicate a subsequent uplink data transmission manner for the terminal.

According to a third aspect, an apparatus is provided. The apparatus may be a terminal device, an apparatus (for example, a chip, a chip system, or a circuit) in the terminal device, or an apparatus that can be used in cooperation with the terminal device. In a design, the apparatus may include modules that are in a one-to-one correspondence with the methods/operations/steps/actions described in the first aspect. The modules may be implemented by a hardware circuit, software, or a combination of a hardware circuit and software. In an embodiment, the apparatus may include a processing module and a communication module. The processing module is configured to invoke the communication module to perform a receiving function and/or a sending function. For example, the communication module is configured to: transmit first uplink data to a network device on a non-dynamically scheduled resource; and receive response information for the first uplink data from the network device, where the response information is used to indicate whether the first uplink data is successfully received.

The response information is further used to indicate whether the processing module monitors a physical downlink control channel (PDCCH) under a configured condition. If the response information indicates the processing module not to monitor the PDCCH under the configured condition, the response information may be further used to indicate to transmit second uplink data by using the non-dynamically scheduled resource under the configured condition. Monitoring of the PDCCH may be considered that the terminal uses dynamic scheduling-based uplink transmission. Transmission of the first uplink data on the non-dynamically scheduled resource may be considered that terminal performs uplink transmission in a non-dynamic scheduling manner. In this case, on the basis that uplink transmission is performed in the non-dynamic scheduling manner, the response message is used to indicate an uplink transmission manner to be used by the terminal subsequently, and may be used to indicate the terminal to perform uplink transmission in the non-dynamic scheduling manner or a dynamic scheduling manner. The uplink transmission manner of the terminal can be dynamically indicated. For example, the uplink transmission manner of the terminal may be indicated based on a requirement of the terminal or a condition of a channel in which the terminal is currently located. Both better reliability performance of the dynamic scheduling-based uplink transmission and performance of a lower transmission delay, lower signaling overheads, and reducing terminal power consumption of non-dynamic scheduling-based uplink transmission are considered, and dual objectives of achieving high reliability and a low delay are compatible. In this way, a waste of power consumption caused by the terminal needing to monitor the PDCCH all the time when the terminal does not obtain an indication of the response information is avoided. Through the indication of the response information, the terminal monitors the PDCCH only when the terminal needs to monitor the PDCCH and does not monitor the PDCCH when the terminal does not need to monitor the PDCCH, thereby saving terminal power consumption.

Non-dynamic scheduling may also be referred to as grant-free (GF), SPS, scheduling-free, dynamic scheduling-free, dynamic grant-free, or higher layer configuration.

In an embodiment, the response information is used to indicate the processing module to monitor a PDCCH under a configured condition, and the processing module is configured to determine, based on the response information, to monitor the PDCCH under the configured condition. The PDCCH is used to schedule uplink data transmission.

In an embodiment, the response information is further used to indicate the terminal to transmit second uplink data by using the non-dynamically scheduled resource under the configured condition. The processing module is configured to determine, based on the response information, to transmit the second uplink data by using the non-dynamically scheduled resource under the configured condition. Transmission of the second uplink data by using the non-dynamically scheduled resource may be understood as follows: For example, the non-dynamically scheduled resource may be periodic, the first uplink data is transmitted in one periodicity, and the second uplink data is transmitted in a next periodicity.

The response information for the first uplink data may alternatively be feedback information for the first uplink data. For example, the response information may be hybrid automatic repeat request (HARQ) feedback information. The response information may further include the HARQ feedback information and other indication information.

In an embodiment, the configured condition may be: in a time window, for example, in specific duration. In this case, that the terminal determines, based on the response information, to monitor the PDCCH under the configured condition may be understood as: The processing module is configured to determine, based on the response information, to monitor the PDCCH in the time window. That the processing module is configured to determine, based on the response information, to transmit the second uplink data by using the non-dynamically scheduled resource under the configured condition may be understood as: The processing module is configured to determine, based on the response information, to transmit the second uplink data by using the non-dynamically scheduled resource in the time window. By indicating the terminal to monitor the PDCCH or transmit the second uplink data by using the non-dynamically scheduled resource in the time window, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource.

In an embodiment, the response information includes indication information of the time window. Optionally, the indication information of the time window may further be separately sent. For example, the indication information of the time window may be carried in an RRC message, a MAC CE, or DCI. The indication information of the time window may be used to indicate a start moment, an end moment, and a length (or duration) of the time window. By indicating a time window in which an uplink transmission manner takes effect, fine-grained control is implemented, and a compromise effect among transmission reliability, terminal power consumption, and resource utilization is improved.

Optionally, the start moment of the time window includes the last symbol in which the response information is received.

In an embodiment, time window monitoring may be implemented by using a timer. For example, the processing module is configured to start or restart the timer in response to the response information, where timer duration of the timer is a length of the time window. If the response information is used to indicate to monitor the PDCCH, the processing module is configured to monitor the PDCCH during running of the timer; or if the response information is used to indicate to transmit the second uplink data in a non-dynamic scheduling manner, the processing module is configured to transmit the second uplink data in the non-dynamic scheduling manner during running of the timer.

In an embodiment, the configured condition may be: in M times of uplink data transmission. In this case, that the processing module is configured to determine, based on the response information, to monitor the PDCCH under the configured condition may be understood as: The processing module is configured to determine, based on the response information, to monitor the PDCCH in M times of uplink data transmission. That the processing module is configured to determine, based on the response information, to transmit the second uplink data by using the non-dynamically scheduled resource under the configured condition may be understood as: The processing module is configured to determine, based on the response information, to transmit the second uplink data by using the non-dynamically scheduled resource in M times of uplink data transmission. By indicating the terminal to monitor the PDCCH or transmit the second uplink data by using the non-dynamically scheduled resource in the M times of uplink data transmission, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource. By indicating that an uplink transmission manner takes effect in M times of uplink transmission, fine-grained control is implemented, and a compromise effect among transmission reliability, terminal power consumption, and resource utilization is improved.

Optionally, the response information includes M. Alternatively, the terminal receives RRC signaling, a MAC CE, or DCI from the network device, where the RRC signaling, the MAC CE, or the DCI carries M.

In an embodiment, the processing module may implement monitoring of a quantity of times of uplink transmission by using a counter. For example, the processing module is configured to start or restart the counter in response to the response information. If the response information is used to indicate to monitor the PDCCH, the processing module is configured to monitor the PDCCH in M times of uplink data transmission recorded by the counter (or before a quantity of times recorded by the counter exceeds M); or if the response information is used to indicate to transmit the second uplink data in a non-dynamic scheduling manner, the processing module is configured to transmit the second uplink data in the non-dynamic scheduling manner.

In an embodiment, each of the M times of uplink data transmission includes K times of repeated transmission of same data. K times of repetition can ensure data packet reliability. A data packet that is repeatedly transmitted for K times in one time of uplink data transmission can be retransmitted without waiting for a feedback from the network device, thereby helping to reduce a delay.

In an embodiment, the response information includes first indication information and second indication information. The first indication information is used to indicate whether the first uplink data is successfully received. For example, a first value in the first indication information is used to indicate that the first uplink data is successfully received, and a second value in the first indication information is used to indicate that the first uplink data is not successfully received. For example, the first value is an ACK, and the second value is a NACK. The second indication information is used to indicate to monitor the PDCCH under the configured condition or indicate to transmit the second uplink data in the non-dynamic scheduling manner under the configured condition.

Optionally, when the second indication information indicates an uplink data transmission manner, an implicit indication may be selected. For example, the uplink data transmission manner is implicitly indicated based on a search space (SS) type (for example, common search space or terminal-specific search space) or a control resource set (CORESET) type (for example, CORESET 0 or CORESET 1) in which a PDCCH carrying the response information is sent, a scrambled radio network temporary identifier (RNTI) type, a DCI format, or the like.

In an embodiment, the response information includes a positive acknowledgment instruction ACK, and the ACK is used to indicate that the first uplink data is successfully received and indicate to transmit the second uplink data in the non-dynamic scheduling manner under the configured condition.

In an embodiment, the response information includes a negative acknowledgment instruction NACK, and the NACK is used to indicate that the first uplink data is not successfully received and indicate to monitor the PDCCH under the configured condition.

An uplink transmission manner is implicitly indicated by using the ACK and the NACK, so that overheads can be reduced.

In an embodiment, the second uplink data is data to-be-transmitted after the first uplink data, and may be retransmitted data of the first uplink data or newly transmitted data. For example, the response information is used to indicate that the first uplink data is successfully received, and the second uplink data is newly transmitted data; or the response information is used to indicate that the first uplink data is not successfully received, and the second uplink data is retransmitted data of the first uplink data.

In an embodiment, the processing module is configured to transmit the second uplink data based on a PDCCH obtained through monitoring under the configured condition. Alternatively, if no PDCCH is monitored under the configured condition, the processing module is configured to transmit the second uplink data in the non-dynamic scheduling manner. After receiving the response information, the terminal may monitor the PDCCH based on the response information, and if the PDCCH is not monitored, the terminal may continue to transmit the second uplink data by using the non-dynamically scheduled resource, without waiting for scheduling of the PDCCH. This prevents a transmission delay from increasing because the PDCCH cannot be monitored for a long time.

In an embodiment, the communication module is configured to send a buffer status report (BSR) to the network device, where the BSR indicates that the terminal buffers data. In this way, after receiving the BSR, the network device may determine, based on the BSR, to indicate a subsequent uplink data transmission manner for the terminal.

According to a fourth aspect, an apparatus is provided. The apparatus may be a network device, an apparatus (for example, a chip, a chip system, or a circuit) in the network device, or an apparatus that can be used in cooperation with the network device. In a design, the apparatus may include modules that are in a one-to-one correspondence with the methods/operations/steps/actions described in the second aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example, the communication module is configured to: receive first uplink data from a terminal; and send response information for the first uplink data to the terminal, where the response information is used to indicate whether the first uplink data is successfully received, and is used to indicate an uplink transmission manner, where the uplink transmission manner may include monitoring a PDCCH under a configured condition, or transmitting second uplink data by using a non-dynamically scheduled resource under the configured condition.

Monitoring of the PDCCH may be considered that the terminal uses dynamic scheduling-based uplink transmission. Transmission of the first uplink data on the non-dynamically scheduled resource may be considered that terminal performs uplink transmission in a non-dynamic scheduling manner. In this case, on the basis that uplink transmission is performed in the non-dynamic scheduling manner, the response message is used to indicate an uplink transmission manner to be used by the terminal subsequently, and may be used to indicate the terminal to perform uplink transmission in the non-dynamic scheduling manner or a dynamic scheduling manner. The uplink transmission manner of the terminal can be dynamically indicated. For example, the uplink transmission manner of the terminal may be indicated based on a requirement of the terminal or a condition of a channel in which the terminal is currently located. Both better reliability performance of the dynamic scheduling-based uplink transmission and performance of a lower transmission delay, lower signaling overheads, and reducing terminal power consumption of non-dynamic scheduling-based uplink transmission are considered, and dual objectives of achieving high reliability and a low delay are compatible. In this way, a waste of power consumption caused by the terminal needing to monitor the PDCCH all the time when the terminal does not obtain an indication of the response information is avoided. Through the indication of the response information, the terminal monitors the PDCCH only when the terminal needs to monitor the PDCCH and does not monitor the PDCCH when the terminal does not need to monitor the PDCCH, thereby saving terminal power consumption.

Non-dynamic scheduling may also be referred to as grant-free (GF), SPS, scheduling-free, dynamic scheduling-free, dynamic grant-free, or higher layer configuration.

In an embodiment, the uplink transmission manner includes monitoring a PDCCH in a time window or transmitting the second uplink data by using the non-dynamically scheduled resource in the time window. By indicating the terminal to monitor the PDCCH or transmit the second uplink data by using the non-dynamically scheduled resource in the time window, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource.

In an embodiment, the uplink transmission manner includes monitoring a physical downlink control channel PDCCH in M times of uplink data transmission or performing M times of uplink transmission on the second uplink data by using the non-dynamically scheduled resource. By indicating the terminal to monitor the PDCCH or transmit the second uplink data by using the non-dynamically scheduled resource in the M times of uplink data transmission, an efficient compromise among transmission reliability, terminal power consumption, and resource utilization can be implemented. For example, when a channel between the terminal and the network device is poor, the network device may indicate the terminal to monitor the PDCCH to perform uplink transmission in a dynamic scheduling manner, to improve transmission reliability. When a channel between the terminal and the network device is good, the network device may indicate the terminal to perform uplink transmission in a non-dynamic scheduling manner, to reduce terminal power consumption and improve utilization of a pre-configured non-dynamically scheduled resource. By indicating that an uplink transmission manner takes effect in M times of uplink transmission, fine-grained control is implemented, and a compromise effect among transmission reliability, terminal power consumption, and resource utilization is improved.

In an embodiment, the response information includes first indication information and second indication information. The first indication information is used to indicate whether the first uplink data is successfully received. For example, a first value in the first indication information is used to indicate that the first uplink data is successfully received, and a second value in the first indication information is used to indicate that the first uplink data is not successfully received. For example, the first value is an ACK, and the second value is a NACK. The second indication information is used to indicate to monitor the PDCCH under the configured condition or indicate to transmit the second uplink data in the non-dynamic scheduling manner under the configured condition.

Optionally, when the second indication information indicates an uplink data transmission manner, an implicit indication may be selected. For example, the uplink data transmission manner is implicitly indicated based on a search space (SS) type (for example, common search space or terminal-specific search space) or a control resource set (CORESET) type (for example, CORESET 0 or CORESET 1) in which a PDCCH carrying the response information is sent, a scrambled radio network temporary identifier (RNTI) type, a DCI format, or the like.

In an embodiment, the response information includes a positive acknowledgment instruction (ACK), and the ACK is used to indicate that the first uplink data is successfully received and indicate to transmit the second uplink data in a non-dynamic scheduling manner under the configured condition; or the response information includes a negative acknowledgment instruction (NACK), and the NACK is used to indicate that the first uplink data is not successfully received and indicate to monitor the PDCCH under the configured condition. An uplink transmission manner is implicitly indicated by using the ACK and the NACK, so that overheads can be reduced.

In an embodiment, the communication module is further configured to receive a buffer status report (BSR) from the terminal, where the BSR indicates that the terminal buffers data. In this way, after receiving the BSR, the network device may determine, based on the BSR, to indicate a subsequent uplink data transmission manner for the terminal.

According to a fifth aspect, an embodiment of this application provides an apparatus. The apparatus includes a communication interface and a processor, and the communication interface is used by the apparatus to communicate with another device, for example, to send and receive data or a signal. For example, the communication interface may be a transceiver, a circuit, a bus, a module, or a communication interface of another type, and the another device may be a network device. The processor is configured to invoke a group of programs, instructions, or data to perform the method described in the first aspect. The apparatus may further include a memory, configured to store the programs, the instructions, or the data invoked by the processor. The memory is coupled to the processor. When executing the instructions or the data stored in the memory, the processor may implement the method described in any one of the first aspect or the possible designs of the first aspect.

According to a sixth aspect, an embodiment of this application provides an apparatus. The apparatus includes a communication interface and a processor, and the communication interface is used by the apparatus to communicate with another device, for example, to send and receive data or a signal. For example, the communication interface may be a transceiver, a circuit, a bus, a module, or a communication interface of another type, and the another device may be a network device. The processor is configured to invoke a group of programs, instructions, or data to perform the method described in the second aspect. The apparatus may further include a memory, configured to store the programs, the instructions, or the data invoked by the processor. The memory is coupled to the processor. When executing the instructions or the data stored in the memory, the processor may implement the method described in any one of the second aspect or the possible designs of the second aspect.

According to a seventh aspect, an embodiment of this application further provides a computer-readable storage medium, where the computer storage medium stores computer-readable instructions, and when the computer-readable instructions are run on a communication apparatus, the communication apparatus is enabled to perform the method according to any one of the first aspect, the second aspect, the possible designs of the first aspect, or the possible designs of the second aspect.

According to a ninth aspect, an embodiment of this application further provides a computer program product, including instructions. When the instructions are run on a communication apparatus, the communication apparatus is enabled to perform the method according to any one of the first aspect or the possible designs of the first aspect, or perform the method according to any one of the second aspect or the possible designs of the second aspect.

According to a tenth aspect, an embodiment of this application provides a chip system. The chip system includes a processor, and may further include a memory, configured to implement the method according to any one of the first aspect, the second aspect, the possible designs of the first aspect, or the possible designs of the second aspect. The chip system may include a chip, or may include a chip and another discrete component.

According to an eleventh aspect, an embodiment of this application provides a system. The system includes the apparatus according to the third aspect or the fifth aspect and the apparatus according to the fourth aspect or the sixth aspect.

DESCRIPTION OF EMBODIMENTS

Embodiments of this application provide a data transmission method and apparatus, to reduce terminal power consumption and ensure transmission reliability during uplink data transmission. The method and the apparatus are based on a same concept. Because a problem-resolving principle of the method is similar to that of the apparatus, mutual reference may be made to implementations of the apparatus and the method. Repeated parts are not described in detail. In descriptions of embodiments of this application, the term "and/or" describes an association relationship between associated objects and indicates that three relationships may exist. For example, A and/or B may indicate the following three cases: Only A exists, both A and B exist, and only B exists. The character "/" between Chinese characters usually indicates an "or" relationship between the associated objects. In embodiments of this application, "at least one" means one or more, and "a plurality of" means two or more. In addition, it should be understood that in descriptions of this application, terms such as "first" and "second" are merely intended for purposes of description, and should not be understood as an indication or implication of relative importance, and cannot be understood as an indication or implication of a sequence.

The data transmission method provided in embodiments of this application may be applied to a long term evolution (LTE) system, a 5th generation (5G) communication system, or various future communication systems, for example, a 6th generation (6G) communication system. 5G may also be referred to as new radio (NR).

The following describes in detail embodiments of this application with reference to the accompanying drawings.

Figure 1:
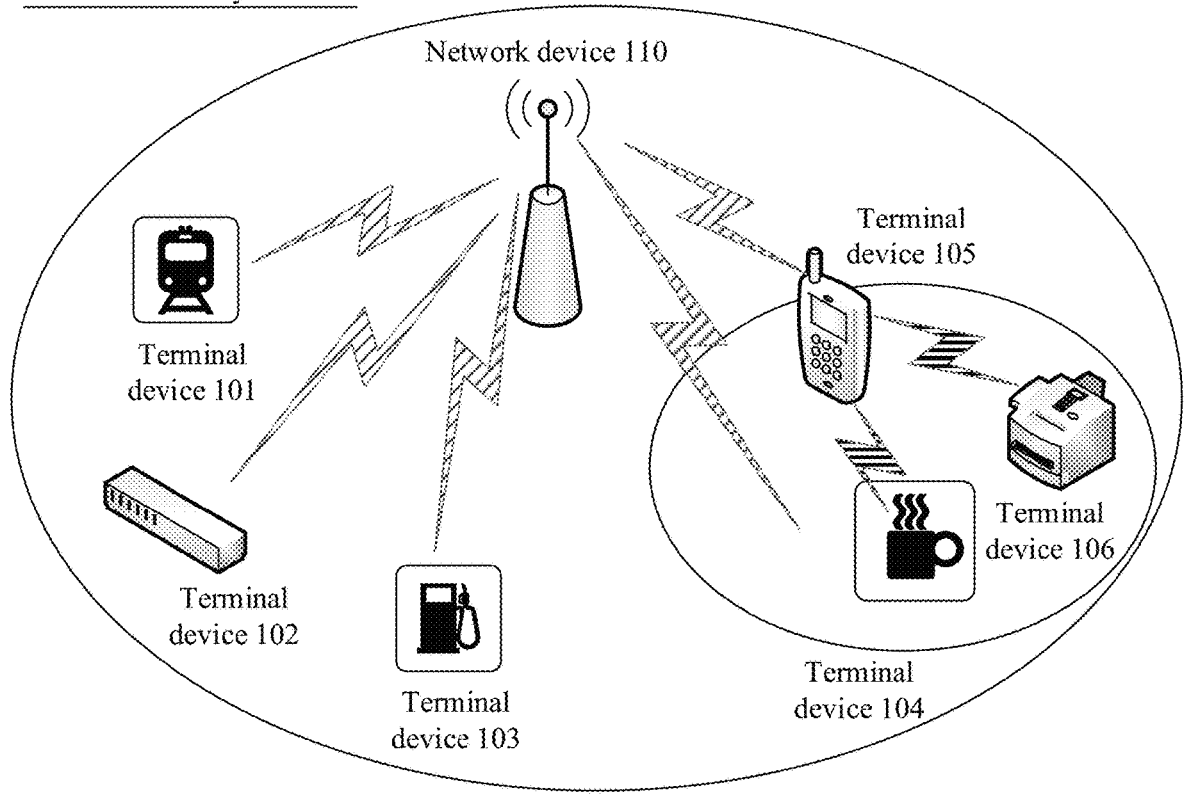
FIG. 1 is a schematic architectural diagram of a communication system according to an embodiment of this application.

FIG. 1 shows an architecture of a possible communication system to which the data transmission method provided in embodiments of this application is applicable. The communication system 100 may include a network device 110 and terminal devices 101 to 106. It should be understood that the communication system 100 may include more or fewer network devices or terminal devices. The network device or the terminal device may be hardware, may be software obtained through functional division, or may be a combination thereof. In addition, the terminal devices 104 to 106 may also form a communication system. For example, the terminal device 105 may send downlink data to the terminal device 104 or the terminal device 106. The network device or the terminal device may communicate with each other by using another device or network element. The network device 110 may perform data transmission with the terminal devices 101 to 106. For example, the network device 110 may send downlink data to the terminal devices 101 to 106, or may receive uplink data sent by the terminal devices 101 to 106; and/or the terminal devices 101 to 106 may send uplink data to the network device 110, or may receive downlink data sent by the network device 110.

The network device 110 is a node in a radio access network (RAN), and may also be referred to as a base station or a RAN node (or device). The network device may also be referred to as a network side device. Currently, the network device 101 is a gNB/NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, (HNB)), a baseband unit (BBU), a wireless fidelity (WiFi) access point (AP), or a network side device in a 5G communication system or a possible future communication system. In embodiments of this application, an apparatus configured to implement a network device function may be a network device, or may be an apparatus that can support the network device in implementing the function, for example, a chip system. The apparatus may be installed in the network device. In the technical solutions provided in embodiments of this application, an example in which an apparatus configured to implement a network device function is a network device or a base station is used to describe the technical solutions provided in embodiments of this application.

The terminal devices 101 to 106 may also be referred to as terminals. The terminal may be user equipment (UE), a mobile station (MS), a mobile terminal (MT), or the like, and is a device that provides voice or data connectivity for a user, or may be an Internet-of-Things device. For example, the terminal devices 101 to 106 each include a handheld device, a vehicle-mounted device, or the like that has a wireless connection function. Currently, the terminal devices 101 to 106 may each be a device that has a wireless transceiver function, and the terminal device may be deployed on the land, including an indoor or outdoor device, a hand-held device, or a vehicle-mounted device, or may be deployed on the water (for example, on a ship), or may be deployed in the air (for example, on a plane, a balloon, or a satellite). The terminal device may be user equipment (UE). The UE may be a handheld device, a vehicle-mounted device, a wearable device, or a computing device that has a wireless communication function. For example, the UE may be a mobile phone, a tablet computer, or a computer that has a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In embodiments of this application, an apparatus configured to implement a terminal function may be a terminal, or may be an apparatus that can support the terminal in implementing the function, for example, a chip system. The apparatus may be installed in the terminal. In embodiments of this application, a chip system may include a chip, or may include a chip and another discrete component. In the technical solutions provided in embodiments of this application, an example in which an apparatus configured to implement a terminal function is a terminal or UE is used to describe the technical solutions provided in embodiments of this application.

In embodiments of this application, the term "data transmission" may further be described as "communication", "information transmission", or "transmission". The technical solutions may be used to perform wireless communication between a scheduling entity and a subordinate entity. Persons skilled in the art may use the technical solutions provided in embodiments of this application to perform wireless communication between another scheduling entity and the subordinate entity, for example, wireless communication between a macro base station and a micro base station, for example, wireless communication between a first terminal and a second terminal.

In embodiments of this application, uplink data transmission of the base station may include dynamic scheduling-based and non-dynamic scheduling-based data transmission. Dynamic scheduling may also be referred to as GB. Non-dynamic scheduling may also be referred to as grant-free (GF), SPS, scheduling-free, dynamic scheduling-free, dynamic grant-free, or higher layer configuration.

Figure 2:
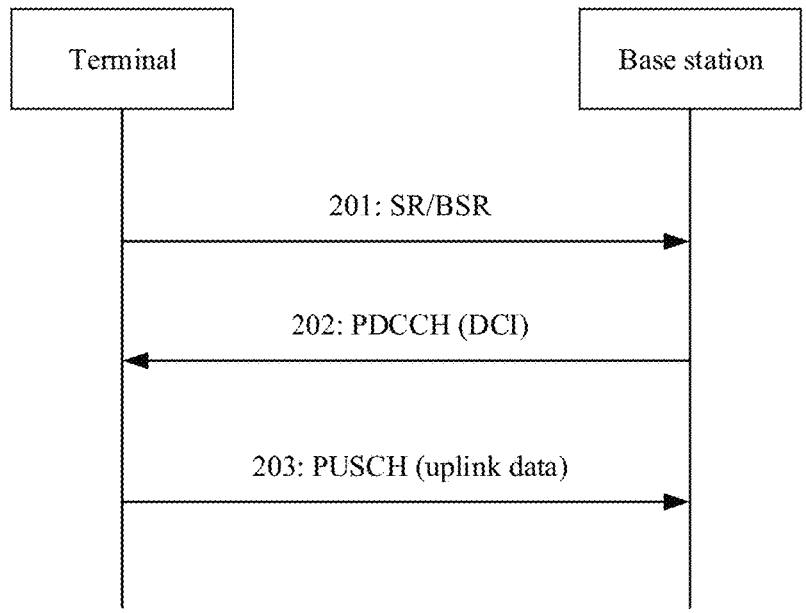
FIG. 2 is a schematic diagram of a process of dynamic scheduling-based data transmission according to an embodiment of this application.

As shown in FIG. 2, the dynamic scheduling-based data transmission may include the following process.

S201: When a terminal has a requirement for uplink data transmission, the terminal usually sends a scheduling request (SR) to a base station through a physical uplink control channel (PUCCH), or the terminal reports a non-empty BSR to the base station through a physical uplink shared channel (PUSCH). The base station receives the SR/BSR sent by the terminal.

The BSR is usually sent by using medium access control (MAC) layer signaling, and is carried in a medium access control control element (MAC CE) of a data packet header.

S202: After receiving the SR or non-empty BSR sent by the terminal, the base station sends DCI to the terminal through a physical downlink control channel (PDCCH).

The DCI carries an uplink grant, used to authorize the terminal to send uplink data by using a specified parameter on a specified time-frequency resource, for example, send the uplink data by using a specified modulation and coding scheme (MCS).

S203: The terminal sends, on the specified time-frequency resource, the uplink data based on the DCI by using the specified parameter through the PUSCH.

During dynamic scheduling, real-time channel information between the terminal and the base station may be efficiently used, and an appropriate location and size of a time-frequency resource, an appropriate transmission parameter, and the like are specified for each time of transmission of the terminal. Therefore, dynamic scheduling-based uplink transmission usually has higher reliability.

In a process of dynamic grant-based uplink data transmission, before sending data, the terminal needs to send the SR or the BSR to the base station, and then the base station grants authority to the terminal by using the DCI. This process introduces a delay and PDCCH signaling overheads. In addition, receiving of the PDCCH usually requires the terminal to perform blind detection on different time-frequency resources based on different control channel element (CCE) aggregation levels, different DCI formats, different DCI lengths, and/or different radio network temporary identifiers. Consequently, a large amount of power consumption is caused. The non-dynamic scheduling-based data transmission can be used to reduce a delay, signaling overheads, and terminal power consumption.

NR is used as an example. NR supports two types of non-dynamic scheduling-based data transmission: type 1 PUSCH transmission with a configured grant (Type 1 PUSCH transmission with a configured grant or Type 1 configured grant PUSCH transmission) and type 2 PUSCH transmission with a configured grant (Type 2 PUSCH transmission with a configured grant or Type 2 configured grant PUSCH transmission).

In the type 1 PUSCH transmission with a configured grant, a higher layer parameter ConfiguredGrantConfig is used to configure all transmission resources and transmission parameters that include a periodicity of a time domain resource, an open-loop power control related parameter, a waveform, a redundancy version sequence, a quantity of times of repetition, a frequency hopping mode, a resource allocation type, a quantity of HARQ processes, a demodulation reference signal (DMRS) related parameter, a modulation and coding scheme table, a resource block group (RBG) size, a time domain resource, a frequency domain resource, a modulation and coding scheme (MCS), and the like. After receiving the higher layer parameter, the terminal may immediately perform PUSCH transmission on a configured time-frequency resource by using the configured transmission parameters.

In the type 2 PUSCH transmission with a configured grant, a two-step resource configuration manner is used: First, a higher layer parameter ConfiguredGrantConfig is used to configure transmission resources and transmission parameters that include a periodicity of a time domain resource, an open-loop power control related parameter, a waveform, a redundancy version sequence, a quantity of times of repetition, a frequency hopping mode, a resource allocation type, a quantity of HARQ processes, a demodulation reference signal related parameter, an MCS table, a resource block group (RBG) size, and the like. Then, the type 2 PUSCH transmission with a configured grant is activated by DCI scrambled by using a CS-cell radio network temporary identifier (radio network temporary identifier, RNTI), and other transmission resources and transmission parameters that include a time domain resource, a frequency domain resource, a DMRS, an MCS, and the like are configured. When receiving the higher layer parameter ConfiguredGrantConfig, the terminal cannot immediately perform PUSCH transmission by using the resources and the parameters that are configured by using the higher layer parameter, but can perform PUSCH transmission only after corresponding activation DCI is received and other resources and parameters are configured.

In addition to the type 1 PUSCH transmission with a configured grant and the type 2 PUSCH transmission with a configured grant, NR also supports another type of non-dynamic scheduling-based data transmission, namely, 2-step (2-step) random access (random access, RA). When the terminal needs to send data, the terminal sends a random access preamble sequence to the base station through a physical random access channel (PRACH), and then sends uplink data to the base station through a PUSCH. The PRACH and the PUSCH may be consecutive or inconsecutive in time. Between a time point of sending the random access preamble sequence and a time point of sending the uplink data, the terminal does not monitor information fed back by the base station for the random access preamble sequence sent by the terminal.

Figure 3:
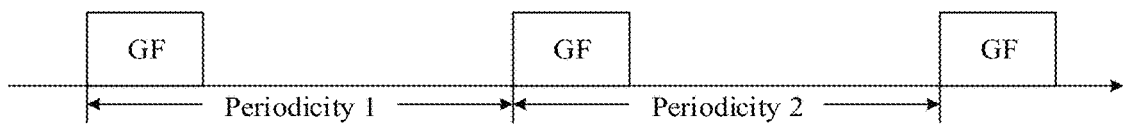
FIG. 3 is a schematic diagram of a process of non-dynamic scheduling-based data transmission according to an embodiment of this application.

Because non-dynamically scheduled time-frequency resources are all configured by the base station in a semi-static manner, which is equivalent to preconfiguring or reserving the resources for the terminal, the resources still exist even if the terminal does not have the requirement for uplink data transmission. As shown in FIG. 3, an example in which non-dynamic scheduling is GF is used. An uplink GF resource configured by the base station in the semi-static manner repeatedly appears in time domain in a periodic manner, and a GF resource in each periodicity is used to transmit an uplink data packet. When a periodic GF resource arrives, if there is a requirement for uplink data transmission, the terminal sends an uplink data packet on the arrived GF resource.

The terminal sends data to the base station by using the semi-statically configured time-frequency resource and the semi-statically configured transmission parameter, so that a transmission delay, signaling overheads, and terminal power consumption can be reduced. However, in consideration of better reliability of the dynamic scheduling-based uplink transmission and a time-varying characteristic of a radio channel between the terminal and the base station, it cannot be specified that, for a purpose of reducing terminal power consumption, the terminal can send uplink data in a grant-free manner only by using a preconfigured grant-free resource, and does not monitor a PDCCH. In this case, when a channel condition is poor, transmission fails, and retransmission is triggered. Consequently, system efficiency is reduced.

Considering that the dynamic scheduling-based uplink transmission has better reliability, and the non-dynamic scheduling-based uplink transmission has a lower transmission delay, lower signaling overheads, and an effect of reducing terminal power consumption, in this embodiment of this application, dynamic scheduling is combined in the non-dynamic scheduling-based uplink transmission, so that dual objectives of achieving high reliability and a low delay are compatible.

Figure 4A:
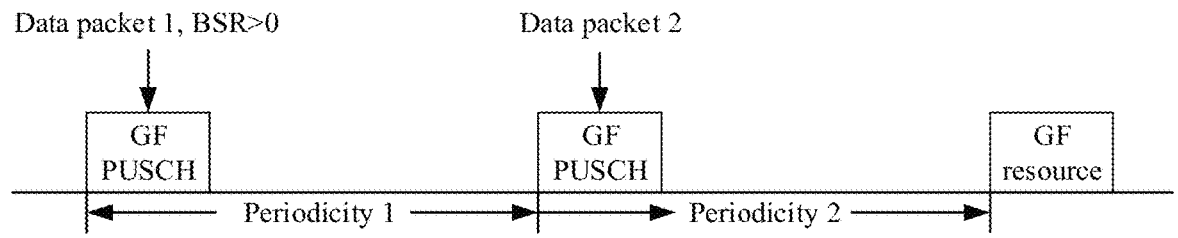
FIG. 4a is a schematic diagram in which a terminal transmits data by using a GF resource according to an embodiment of this application.
Figure 4B:
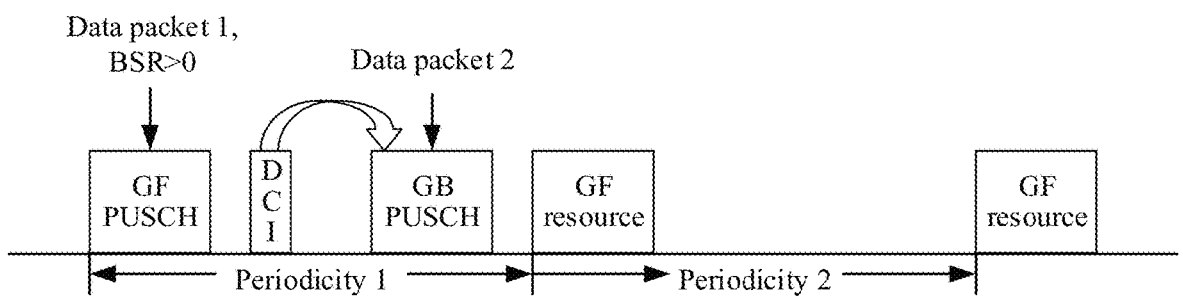
FIG. 4b is a schematic diagram in which a terminal transmits data by using a dynamic resource on a non-dynamic scheduling basis according to an embodiment of this application.

In a possible implementation, as shown in FIG. 4a and FIG. 4b, a base station configures a periodic uplink GF resource for a terminal in a semi-static manner. A periodicity 1 and a periodicity 2 are two consecutive periodicities. The terminal sends a PUSCH on a GF resource in the periodicity 1, where the PUSCH carries uplink data (for example, a data packet 1); and the terminal includes the PUSCH in a BSR, to notify the base station that data in a buffer of the terminal still needs to be sent. In this case, the terminal transmits a next data packet (for example, denoted as a data packet 2) in two manners. As shown in FIG. 4a, the first manner is to send the data packet 2 by using a GF resource in the periodicity 2. As shown in FIG. 4b, the other manner is: The base station indicates, by using DCI, the terminal to send the data packet 2 on a specified time-frequency resource in a dynamic grant manner.

In a possible implementation, because the terminal does not know whether the base station delivers the DCI to schedule transmission of subsequent data packets of the terminal, the terminal needs to continuously monitor a possible PDCCH used for dynamic scheduling-based uplink data transmission. For example, the terminal sends the PUSCH on the GF resource in the periodicity 1, where the PUSCH carries the data packet 1 and the BSR. After sending the PUSCH on the GF resource in the periodicity 1, the terminal continuously monitors the PDCCH. If a PDCCH used to schedule the data packet 2 is monitored, the terminal sends the data packet 2 on the specified time-frequency resource based on scheduling information. If no PDCCH used to schedule the data packet 2 is not monitored before the GF resource in the periodicity 2 arrives, the terminal may continue to send the data packet 2 in a grant-free transmission manner by using the GF resource; or the terminal does not send the data packet 2 by using the GF resource, but continues to monitor the PDCCH used to schedule the data packet 2. In other words, regardless of whether the terminal finally sends the data packet 2 in the grant-free manner or the dynamic grant manner, the terminal always needs to monitor the PDCCH used to schedule the data packet 2. In this implementation, the terminal needs to continuously monitor the PDCCH used to schedule uplink data transmission, and sends, only when no PDCCH is monitored, uplink data in the grant-free manner by using a preconfigured grant-free resource. However, monitoring of the PDCCH consumes a large amount of terminal power consumption, which is unacceptable for a terminal with limited battery capacity or service life, such as a machine type communication terminal.

Embodiments of this application provide a data transmission method, which can help reduce power consumption of monitoring a PDCCH by a terminal and consider transmission reliability and grant-free resource utilization.

Figure 5:
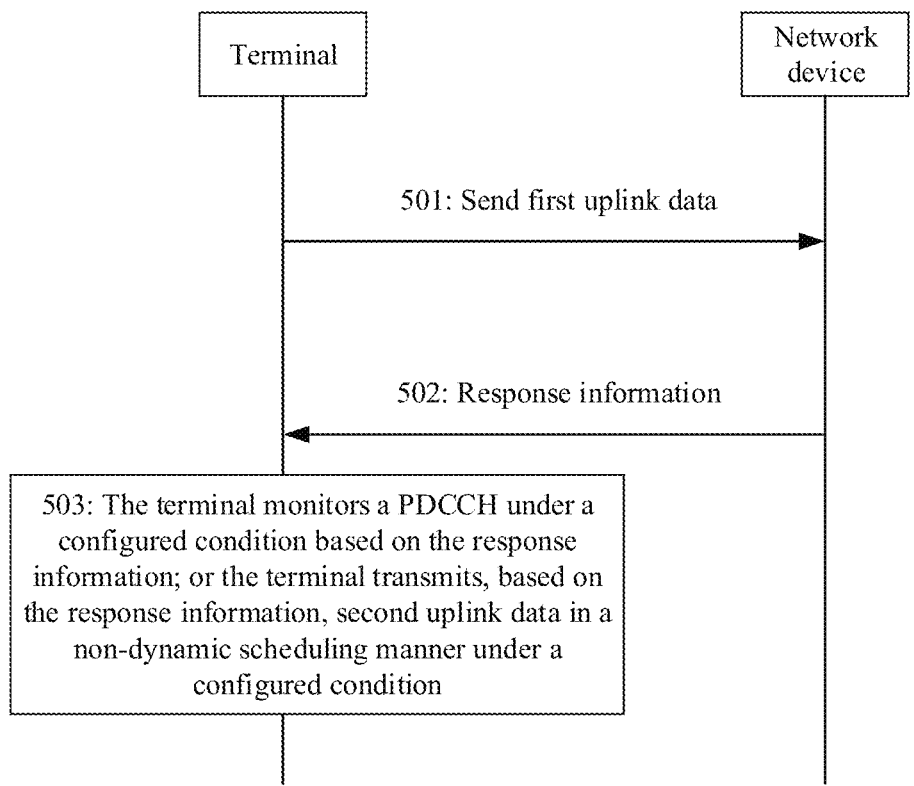
FIG. 5 is a schematic flowchart 1 of a data transmission method according to an embodiment of this application.

As shown in FIG. 5, a procedure of the data transmission method provided in embodiments of this application is described as follows. For example, the method is performed by a terminal and a network device.

S501: The terminal transmits first uplink data to the network device on a non-dynamically scheduled resource, and the network device receives the first uplink data from the terminal.

The non-dynamically scheduled resource herein may also be referred to as a non-dynamically scheduled time-frequency resource. The non-dynamically scheduled resource or the non-dynamically scheduled time-frequency resource is a time-frequency resource allocated by the network device to the terminal in a scenario in which non-dynamic scheduling-based data transmission is used. As described above, non-dynamic scheduling may also be referred to as GF, SPS, scheduling-free, dynamic scheduling-free, dynamic grant-free, 2-step random access (2-step RACH), or higher layer configuration. In this case, the non-dynamically scheduled resource or the non-dynamically scheduled time-frequency resource may also be referred to as a GF resource/GF time-frequency resource, an SPS resource/SPS time-frequency resource, a scheduling-free resource/scheduling-free time-frequency resource, a dynamic scheduling-free resource/dynamic scheduling-free time-frequency resource, a dynamic grant-free resource/dynamic grant-free time-frequency resource, a 2-step random access resource/2-step random access time-frequency resource, or a resource configured by a higher layer/time-frequency resource configured by a higher layer. The higher layer usually refers to an RRC layer, and higher layer configuration usually refers to configuration performed by using RRC signaling.

The first uplink data is a data packet or a data packet sent only once by the terminal on the non-dynamically scheduled resource. For example, the non-dynamically scheduled resource usually appears as a periodic resource, and the terminal sends the first uplink data on a time-frequency resource in one periodicity. When to-be-sent data needs to be sent, the terminal sends the first uplink data by using the non-dynamically scheduled resource. An amount of to-be-sent data may be greater than that of the first uplink data, and the terminal cannot completely send the to-be-sent data in one periodicity.

The terminal may send a BSR to the network device, to notify a base station of a data buffer status of the terminal, that is, whether there is data still needing to be sent. For example, after the terminal sends the first uplink data, when there is to-be-sent data still needing to be sent, the terminal sends the BSR to the network device, to notify the network device that there is to-be-sent data still needing to be sent. For another example, when a large data packet needs to be sent or the terminal determines that uplink scheduling is required due to a poor channel condition, or in another scenario, the terminal may send the BSR to the network device, to request the network device to dynamically schedule an uplink transmission resource.

Optionally, the terminal sends a PUSCH on the non-dynamically scheduled resource, and includes the first uplink data in the PUSCH. The terminal may further include the BSR in the PUSCH.

The network device receives the PUSCH, to obtain the first uplink data and the BSR. The network device may choose to send, to the terminal, a PDCCH used to schedule uplink data transmission, or may choose not to send the PDCCH to the terminal. Whether the terminal monitors the PDCCH is implemented in S502.

S502: The network device returns response information for the first uplink data to the terminal, and the terminal receives the response information for the first uplink data from the network device. The response information for the first uplink data may be briefly described as the response information. For example, the response information may include hybrid automatic repeat request (HARQ) feedback information, or may include other indication information.

The response information is used to indicate whether the first uplink data is successfully received.

The response information may be further used to indicate the terminal to transmit second uplink data in a non-dynamic scheduling manner under a configured condition. In this embodiment of this application, "transmission in the non-dynamic scheduling manner" may be understood as "transmission by using the non-dynamically scheduled resource" or "transmission by using the non-dynamically scheduled time-frequency resource". The "non-dynamic scheduling manner" may also be understood as a "non-dynamic scheduling-based transmission manner".

Alternatively, the response information may be further used to indicate the terminal to monitor the PDCCH under the configured condition. The PDCCH is used to dynamically schedule uplink data transmission, or the PDCCH is used to schedule PDSCH transmission, and scheduling information used to schedule uplink data transmission is carried in the PDSCH transmission.

Optionally, the response information is used to indicate that when the terminal is to monitor a PDCCH under a configured condition, the terminal first sends a random access preamble sequence to the network device before monitoring the PDCCH, and then monitors the PDCCH. The PDCCH is used to schedule PDSCH transmission, and scheduling information used to schedule uplink data transmission is carried in the PDSCH transmission. In this process, that the terminal sends the random access preamble sequence to the network device is the first step in 4-step random access (4-step RACH) or the first step in early data transmission (EDT). That the terminal monitors the PDCCH and receives the PDSCH based on the monitored PDCCH is the second step in the 4-step random access or an early data transmission process. EDT may also be referred to as 2-step random access (2-step RACH).

In a first possible implementation, the response information includes first indication information and second indication information. The first indication information includes a positive acknowledgment instruction (ACK) or a negative acknowledgment (NACK). The first indication information is the ACK, and is used to indicate that the first uplink data is successfully received. Alternatively, the first indication information is the NACK, and is used to indicate that the first uplink data is not successfully received. The second indication information is used to indicate the terminal to monitor a PDCCH under a configured condition, where the PDCCH is used to dynamically schedule uplink data transmission, or the PDCCH is used to schedule PDSCH transmission, and scheduling information used to schedule uplink data transmission is carried in the PDSCH transmission. Alternatively, the response information is used to indicate the terminal to transmit second uplink data in a non-dynamic scheduling manner under a configured condition. In this implementation, dedicated second indication information is used to indicate an uplink data transmission manner of the terminal.

In a second possible implementation, the response information includes an ACK or a NACK. When the response information carries the ACK, the response information is used to indicate that the first uplink data is successfully received, and is used to indicate the terminal to transmit second uplink data in a non-dynamic scheduling manner under a configured condition. When the response information carries the NACK, the response information is used to indicate that the first uplink data is not successfully received, and is used to indicate the terminal to monitor a PDCCH under a configured condition. In this implementation, an uplink data transmission manner of the terminal is implicitly indicated by using the ACK/NACK. Certainly, implicitly indicating the uplink data transmission manner of the terminal by using the ACK/NACK may alternatively be implemented in the following manner: When the response information carries the ACK, the response information is used to indicate that the first uplink data is successfully received, and is used to indicate the terminal to monitor a PDCCH under a configured condition. When the response information carries the NACK, the response information is used to indicate that the first uplink data is not successfully received, and is used to indicate the terminal to transmit second uplink data in a non-dynamic scheduling manner under a configured condition.

The network device may return the response information to the terminal through the PDCCH, and the terminal receives the PDCCH from the network device to obtain the response information. For example, the network device may return the response information by using a terminal-specific (UE-specific) DCI format or a common (group common) DCI format. In this case, in the second possible implementation, the network device may indicate the ACK or the NACK by using one bit. For example, 1 indicates the ACK, and 0 indicates the NACK. Further, the uplink data transmission manner may be implicitly indicated by using the ACK and the NACK. In the first possible implementation, if the uplink data transmission manner is indicated by using the second indication information, the network device may explicitly include the first indication information and the second indication information in the response information.

For example, the response information for uplink data transmission of the terminal includes two bits, where one bit is used to indicate the ACK or the NACK, and the other bit is used to indicate the uplink data transmission manner. Alternatively, the network device may implicitly include the second indication information. For example, different uplink data transmission manners are implicitly indicated based on different search space (search space, SS) types (for example, common search space or terminal-specific search space) and/or different control resource set (CORESET) types (for example, CORESET 0 and CORESET 1) in which PDCCHs carrying the response information are sent, different radio network temporary identifier (RNTI) types used for scrambling, different DCI formats, and/or the like. For example, when the DCI format is a first format, the DCI format is used to indicate an uplink transmission manner; or when the DCI format is a second format, the DCI format is used to indicate another uplink transmission manner.

Alternatively, the network device may send a sequence to the terminal to indicate the response information. In the second possible implementation, for example, the network device may send a sequence 1 and a sequence 2 to the terminal, where the sequence 1 indicates the ACK, and the sequence 2 indicates the NACK. Further, the uplink data transmission manner may be implicitly indicated by using the ACK and the NACK. In the first possible implementation, if the uplink data transmission manner is indicated by using the second indication information, the network device may send a sequence 1, a sequence 2, a sequence 3, and a sequence 4 to the terminal, where the sequence 1 indicates the ACK, the sequence 2 indicates the NACK, the sequence 3 indicates to monitor the PDCCH under the configured condition, and the sequence 4 indicates to transmit the uplink data in the non-dynamic scheduling manner under the configured condition. The sequence 1, the sequence 2, the sequence 3, and the sequence 4 are different from each other.

Alternatively, the network device may return the response information to the terminal through the PDSCH, and the terminal receives the PDSCH from the network device to obtain the response information. For example, in the second possible implementation, the network device may indicate the ACK or the NACK by using one bit. For example, 1 indicates the ACK, and 0 indicates the NACK. Further, the uplink data transmission manner may be implicitly indicated by using the ACK and the NACK. In the first possible implementation, if the uplink data transmission manner is indicated by using the second indication information, the network device may explicitly include the first indication information and the second indication information in the response information. For example, the response information for uplink data transmission of the terminal includes two bits, where one bit is used to indicate the ACK or the NACK, and the other bit is used to indicate the uplink data transmission manner. Alternatively, the network device may implicitly include the second indication information, for example, implicitly indicate the uplink data transmission manner based on a time-frequency resource location at which a PDSCH carrying the response information is sent.

In this embodiment of this application, after the terminal sends the first uplink data to the network device and before the terminal receives the response information from the network device, an operation performed by the terminal is not limited. The terminal may monitor the PDCCH, or may not monitor the PDCCH.

S503: The terminal monitors the PDCCH under the configured condition based on the response information; or the terminal transmits, based on the response information, the second uplink data in the non-dynamic scheduling manner under the configured condition.

The second uplink data is data to be sent by the terminal. The second uplink data may be newly transmitted data. For example, after the terminal sends the first uplink data, if to-be-sent data is not completely sent, the terminal further needs to send the second uplink data in the to-be-sent data. It may alternatively be understood that after the terminal sends the first uplink data, new to-be-sent data still needs to be sent, and the second uplink data is the new to-be-sent data. When the response information is used to indicate that the first uplink data is successfully received, the second uplink data is newly transmitted data.

In another case, the second uplink data may alternatively be retransmitted data of the first uplink data. For example, when the response information is used to indicate that the first uplink data is not successfully received, the second uplink data is retransmitted data of the first uplink data.

The terminal monitors the PDCCH under the configured condition. If the terminal obtains the PDCCH through monitoring, the terminal transmits a second uplink data packet based on an indication of the monitored PDCCH. If the terminal does not obtain the PDCCH through monitoring when a non-dynamically scheduled resource in a next periodicity arrives, the terminal may choose to send the second uplink data packet by using a grant-free resource in a grant-free manner, or may choose to continue to monitor the PDCCH. For an operation to be performed when the terminal does not obtain the PDCCH through monitoring, an agreed manner or a manner indicated by the base station may be used, so that when no PDCCH is monitored and there is an available grant-free resource, the terminal is allowed to send the uplink data by using the grant-free resource in the grant-free manner, or the terminal does not send the uplink data temporarily and continues to monitor the PDCCH.

According to the data transmission method provided in this embodiment of this application, the response information indicates the terminal to monitor the PDCCH or transmit the second uplink data in the non-dynamic scheduling manner under the configured condition. This avoids a large amount of power consumption caused by continuous monitoring of the PDCCH by the terminal, and helps reduce power consumption of monitoring the PDCCH by the terminal. Dynamic scheduling-based uplink transmission is used in a process of performing uplink transmission on the non-dynamically scheduled resource, so that both transmission reliability and grant-free resource utilization can be considered.

In this embodiment of this application, the foregoing configured condition may include, but is not limited to, the following possibilities.

1. First Possibility:

The configured condition is: in specific duration. For example, the duration is denoted as first duration. In this case, the response information is used to indicate to monitor the PDCCH in the first duration or indicate to transmit the uplink data in the non-dynamic scheduling manner in the first duration.

The first duration is a specific length in time domain, for example, may be one subframe or one or more slots, or may be one or more periodicities of non-dynamic scheduling, or may be specific absolute time, for example, 1 ms, 2 ms, or 5 ms.

The first duration may be indicated by using at least two of a start moment, an end moment, and the first duration. For example, at least two of the start moment, the end moment, and the first duration may be agreed upon by the terminal and the network device, specified in a protocol, or delivered by the network device to the terminal by using indication information. The indication information includes radio resource control (RRC), a medium access control control element (MAC CE), DCI, or the response information.

The foregoing duration may also be referred to as a time window, and the first duration may also be referred to as a first time window. The time window may be indicated by using at least two of a start point, an end point, or the duration.

Optionally, a start moment of the first duration is the last symbol at which the terminal receives the response information, and the symbol may be an orthogonal frequency division multiplexing (OFDM) symbol.

Optionally, an end moment of the first duration is the last symbol on a non-dynamically scheduled resource in a next periodicity. The next periodicity is a periodicity next to a periodicity in which the non-dynamically scheduled resource occupied by the terminal to transmit the first uplink data is located.

The first duration may be timed by a timer.

For example, if the response information is used to indicate to monitor the PDCCH in the first duration, the terminal starts a timer based on the response information, and monitors the PDCCH during timing of the timer. When the timer expires, an indication of the response information is invalid.

For another example, if the response information is used to indicate to transmit the uplink data in the non-dynamic scheduling manner in the first duration, the terminal starts or restarts a timer based on the response information, and transmits uplink data in the non-dynamic scheduling manner during timing of the timer. When the timer expires, an indication of the response information is invalid.

In a possibility, if the terminal receives another piece of response information from the network device during timing of the timer, the terminal restarts the timer, and determines an uplink data transmission manner based on the another piece of response information during timing of the restarted timer.

The timer used when the response information is used to indicate to monitor the PDCCH in the first duration and the timer used when the response information is used to indicate to transmit the uplink data in the non-dynamic scheduling manner in the first duration may be the same or different. If the timers are different, for example, if the response information is used to indicate to monitor the PDCCH in the first duration, the terminal starts or restarts a first timer based on the response information, and monitors the PDCCH during timing of the first timer.

When the first timer expires, an indication of the response information is invalid.

If the response information is used to indicate to transmit the uplink data in the non-dynamic scheduling manner in the first duration, the terminal starts or restarts a second timer based on the response information, and transmits the uplink data in the non-dynamic scheduling manner during timing of the second timer. When the second timer expires, an indication of the response information is invalid.

In a possibility, if the terminal receives another piece of response information from the network device during timing of the first timer, and if the another piece of response information is used to indicate to monitor the PDCCH in the first duration, the terminal restarts the first timer; or if the another piece of response information is used to indicate to transmit the uplink data in the non-dynamic scheduling manner in the first duration, the terminal stops the first timer, and starts the second timer.

It should be noted that, that the terminal starts or restarts a timer based on the response information may be that the terminal starts or restarts the timer when receiving the response information. When the response information includes first indication information and second indication information, the terminal starts or restarts the timer when receiving the second indication information. When the response information includes an ACK/a NACK, an uplink transmission manner is implicitly indicated by using the ACK/NACK, and the terminal starts or restarts a timer when receiving the ACK/NACK.

Similarly, if the terminal receives another piece of response information from the network device during timing of the second timer, and if the another piece of response information is used to indicate to monitor the PDCCH in the first duration, the terminal stops the second timer, and starts the first timer; or if the another piece of response information is used to indicate to transmit the uplink data in the non-dynamic scheduling manner in the first duration, the terminal restarts the second timer.

2. Second Possibility:

The configured condition is: in M times of uplink data transmission. M is a positive integer, and M is greater than or equal to 1. In this case, the response information is used to indicate to monitor the PDCCH in the M times of uplink data transmission or indicate to transmit the uplink data in the non-dynamic scheduling manner in the M times of uplink data transmission.

The M times of uplink data transmission may refer to initial transmission of M data packets, in other words, any of M times of transmission is initial transmission of a new data packet. The M times of uplink data transmission may alternatively include both initial transmission of a data packet and retransmission of the data packet.

Any transmission (initial transmission or retransmission) in the M times of uplink data transmission may include K times of repetition of a data packet. K>1, and K is a positive integer. K times of repetition can ensure data packet reliability. K times of repetition mean that K repeated data packets are bundled or aggregated together, and transmitted to the network device at a time, that is, one time of uplink data transmission. A data packet that is repeatedly transmitted for K times in one time of uplink data transmission can be retransmitted without waiting for a feedback from the network device, thereby helping to reduce a delay.

In this embodiment of this application, the terminal may agree on a value of M with the network device in advance, or the value of M may be specified in a protocol, or the network device sends indication information to the terminal, and the terminal determines the value of M by using the indication information. The indication information may be carried by using RRC, a MAC CE, DCI, or the like, or may be carried in the response information.

Similar to the scenario of the first duration, M times may be implemented by using a counter.

For example, if the response information is used to indicate to monitor the PDCCH in the M times of uplink data transmission, the terminal starts or restarts a counter based on the response information, and monitors the PDCCH when a count value of the counter is less than or equal to M. If the count value of the counter is greater than M, an indication of the response information is invalid.

For another example, if the response information is used to indicate to transmit the uplink data in the non-dynamic scheduling manner in the M times of uplink data transmission, the terminal starts or restarts a counter based on the response information, and transmits the uplink data in the non-dynamic scheduling manner when a count value of the counter is less than or equal to M. If the count value of the counter is greater than M, an indication of the response information is invalid.

In a possibility, if the terminal receives another piece of response information from the network device when the count value of the counter is less than or equal to M, the terminal restarts the counter, and determines an uplink data transmission manner based on the another piece of response information when the count value of the restarted counter is less than or equal to M.

The counter used when the response information is used to indicate to monitor the PDCCH in the M times of uplink data transmission and the counter used when the response information is used to indicate to transmit the uplink data in the non-dynamic scheduling manner in the M times of uplink data transmission may be the same or different. If the counters are different, for example, if the response information is used to indicate to monitor the PDCCH in the M times of uplink data transmission, the terminal starts or restarts a first counter based on the response information, and monitors the PDCCH when a count value of the first counter is less than or equal to M.

If the count value of the first counter is greater than M, an indication of the response information is invalid.

If the response information is used to indicate to transmit the uplink data in the non-dynamic scheduling manner in the M times of uplink data transmission, the terminal starts or restarts a second counter based on the response information, and transmits the uplink data in the non-dynamic scheduling manner when a count value of the second counter is less than or equal to M. If the count value of the second counter is greater than M, an indication of the response information is invalid.

In a possibility, if the terminal receives another piece of response information from the network device when the count value of the first counter is less than or equal to M, and if the another piece of response information is used to indicate to monitor the PDCCH in the M times of uplink data transmission, the terminal restarts the first counter; or if the another piece of response information is used to indicate to transmit the uplink data in the non-dynamic scheduling manner in the M times of uplink data transmission, the terminal stops the first counter, and starts the second counter.

Similarly, if the terminal receives another piece of response information from the network device when the count value of the second counter is less than or equal to M, and if the another piece of response information is used to indicate to monitor the PDCCH in the M times of uplink data transmission, the terminal stops the second counter, and starts the first counter; or if the another piece of response information is used to indicate to transmit the uplink data in the non-dynamic scheduling manner in the M times of uplink data transmission, the terminal restarts the second counter.

The following describes, by using an example, the data transmission method in the possible scenario in which the configured condition is: in the first duration.

Figure 6:
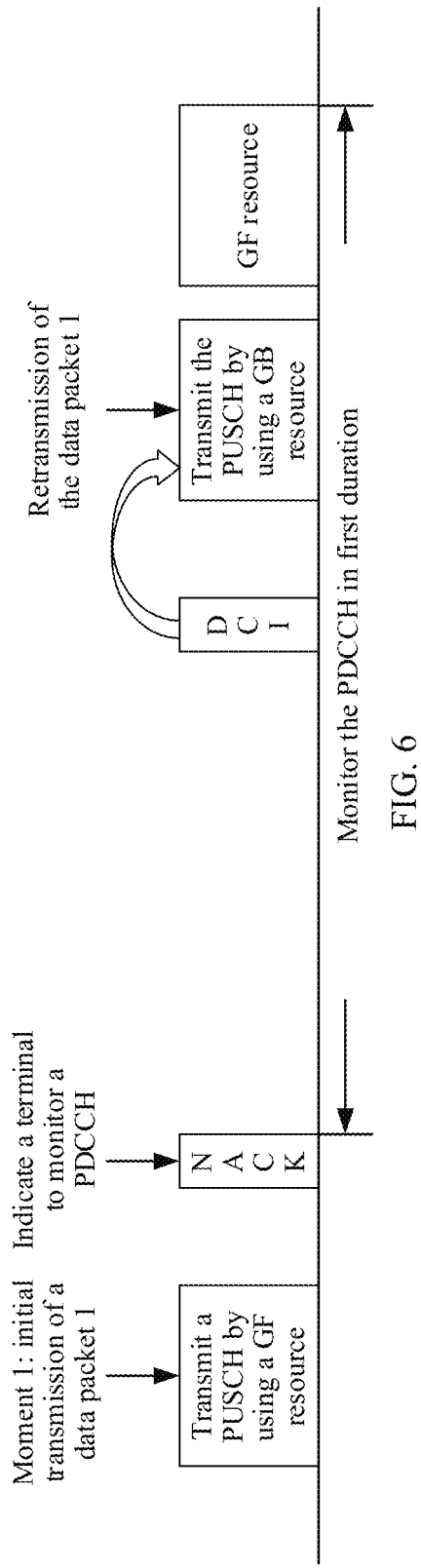
FIG. 6 is a schematic diagram of a data transmission method in a scenario in which a configured condition is: in first duration according to an embodiment of this application.

As shown in FIG. 6, first uplink data is represented by a data packet 1. It is assumed that second uplink data is retransmitted data of the first uplink data, that is, retransmitted data of the data packet 1. A terminal sends the initially transmitted data packet 1 by using a grant-free GF resource at a moment 1. A network device does not correctly receive the data packet 1 sent by the terminal by using the grant-free resource at the moment 1. The network device sends response information of the data packet 1 to the terminal, where the response information of the data packet 1 is used to indicate that the data packet 1 is not correctly/successfully received, and is further used to indicate the terminal to monitor a PDCCH in first duration. For example, if the foregoing first possible implementation is used, the response information includes first indication information and second indication information. The first indication information is a NACK and is used to indicate that the data packet 1 is not successfully received. The second indication information is used to indicate the terminal to monitor the PDCCH in the first duration. If the foregoing second possible implementation is used, the response information includes a NACK, the NACK is used to indicate that the data packet 1 is not successfully received, and the NACK is further used to indicate the terminal to monitor the PDCCH in the first duration. The terminal receives the response information and monitors the PDCCH in the first duration. For example, a start moment of the first duration is the last symbol at which the terminal receives the response information, and an end moment of the first duration is the last symbol on a non-dynamically scheduled GF resource in a next periodicity. The terminal obtains, through monitoring in the first duration, DCI sent by the network device through the PDCCH, and obtains an uplink grant (UL grant) carried in the DCI. The terminal sends a PUSCH on a GB time-frequency resource indicated by the DCI, where the retransmitted data of the data packet 1 is carried in the PUSCH.

Figure 7:
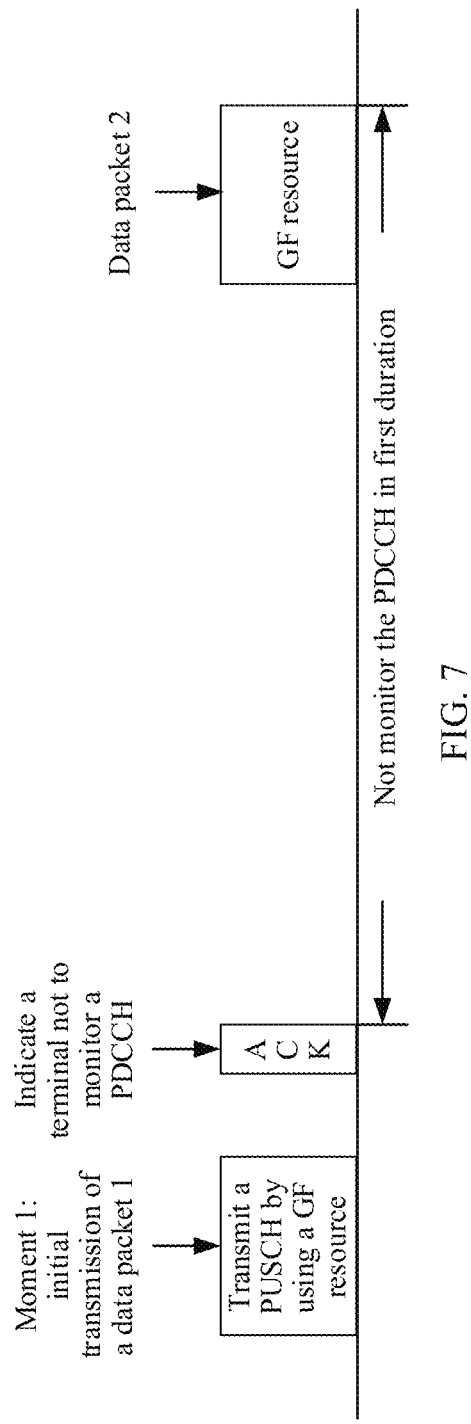
FIG. 7 is a schematic diagram of another data transmission method in a scenario in which a configured condition is: in first duration according to an embodiment of this application.

As shown in FIG. 7, first uplink data is represented by a data packet 1. It is assumed that second uplink data is newly transmitted data, and the second uplink data is represented by a data packet 2. The data packet 2 may indicate a data packet transmitted for one or more times. A terminal sends the initially transmitted data packet 1 by using a grant-free GF resource at a moment 1. A network device correctly receives the data packet 1 sent by the terminal by using a non-dynamically scheduled resource (or a grant-free resource) at the moment 1. The network device sends response information of the data packet 1 to the terminal, where the response information is used to indicate that the data packet 1 is correctly/successfully received, and is further used to indicate the terminal to transmit the data packet 2 in a non-dynamic scheduling manner in first duration, that is, not to monitor a PDCCH in the first duration. For example, if the foregoing first possible implementation is used, the response information includes first indication information and second indication information. The first indication information is an ACK and is used to indicate that the data packet 1 is successfully received. The second indication information is used to indicate the terminal to transmit the data packet 2 in the non-dynamic scheduling manner in the first duration. If the foregoing second possible implementation is used, the response information includes an ACK, the ACK is used to indicate that the data packet 1 is successfully received, and the ACK is further used to indicate the terminal to transmit the data packet 2 in the non-dynamic scheduling manner in the first duration. The terminal receives the response information and transmits the data packet 2 in the non-dynamic scheduling manner in the first duration. For example, a start moment of the first duration is the last symbol at which the terminal receives the response information, and an end moment of the first duration is the last symbol on a non-dynamically scheduled GF resource in a next periodicity. The terminal transmits the data packet 2 on the non-dynamically scheduled GF resource in the next periodicity in the first duration.

FIG. 6 and FIG. 7 are merely two examples. During actual application, there may be other possible implementations. For example, based on the example shown in FIG. 6, the second uplink data is retransmitted data of the data packet 1. The response information received by the terminal from the network device is used to indicate that the data packet 1 is not successfully received, and is used to indicate not to monitor the PDCCH in the first duration and indicate to transmit the retransmitted data of the data packet 1 in the non-dynamic scheduling manner. For another example, based on the example shown in FIG. 7, the data packet 2 is newly transmitted data, and the response information received by the terminal from the network device is used to indicate that the data packet 1 is successfully received, and is used to indicate to monitor the PDCCH in the first duration.

The following describes, by using an example, the data transmission method in the possible scenario in which the configured condition is: in the M times of uplink transmission. For example, M=2, and M=2 times of uplink data transmission include first time of uplink data transmission and second time of uplink data transmission.

Figure 8:
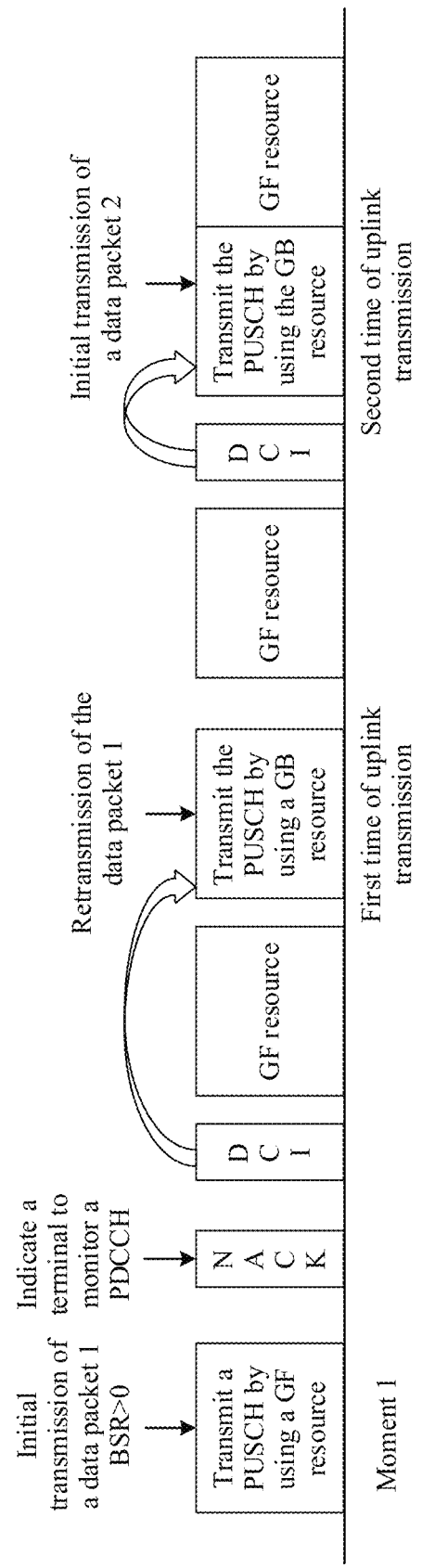
FIG. 8 is a schematic diagram of a data transmission method in a scenario in which a configured condition is: in M times of uplink transmission according to an embodiment of this application.

As shown in FIG. 8, first uplink data is represented by a data packet 1, second uplink data is data transmitted after the first uplink data, and may be retransmitted data of the data packet 1, or may be newly transmitted data. The newly transmitted data is represented by a data packet 2.

A terminal sends the initially transmitted data packet 1 by using a grant-free GF resource at a moment 1. A network device does not correctly receive the data packet 1 sent by the terminal by using the grant-free resource at the moment 1. The network device sends response information of the data packet 1 to the terminal, where the response information is used to indicate that the data packet 1 is not correctly/successfully received, and is further used to indicate the terminal to monitor a PDCCH in M times (namely, two times) of uplink data transmission. For example, if the foregoing first possible implementation is used, the response information includes first indication information and second indication information. The first indication information is a NACK and is used to indicate that the data packet 1 is not successfully received. The second indication information is used to indicate the terminal to monitor the PDCCH in the M times (namely, two times) of uplink data transmission. If the foregoing second possible implementation is used, the response information includes a NACK, the NACK is used to indicate that the data packet 1 is not successfully received, and the NACK is further used to indicate the terminal to monitor the PDCCH in the M times (namely, two times) of uplink data transmission. The terminal receives the response information and monitors the PDCCH in the M times (namely, two times) of uplink data transmission. The terminal obtains, through monitoring in the two times of uplink data transmission after the moment 1, DCI sent by the network device through the PDCCH, and obtains an uplink grant (UL grant) carried in the DCI. Assuming that the terminal obtains the DCI through monitoring after the moment 1 and before a next GF resource arrives, the terminal sends, in the first time of uplink data transmission and the second time of uplink data transmission after the moment 1, a PUSCH on a GB time-frequency resource indicated by the DCI. The PUSCH carries newly transmitted or retransmitted data. For example, the PUSCH carries the retransmitted data of the data packet 1 during the first time of uplink data transmission, and carries initially transmitted data of the data 2 during the second time of uplink data transmission.

Figure 9:
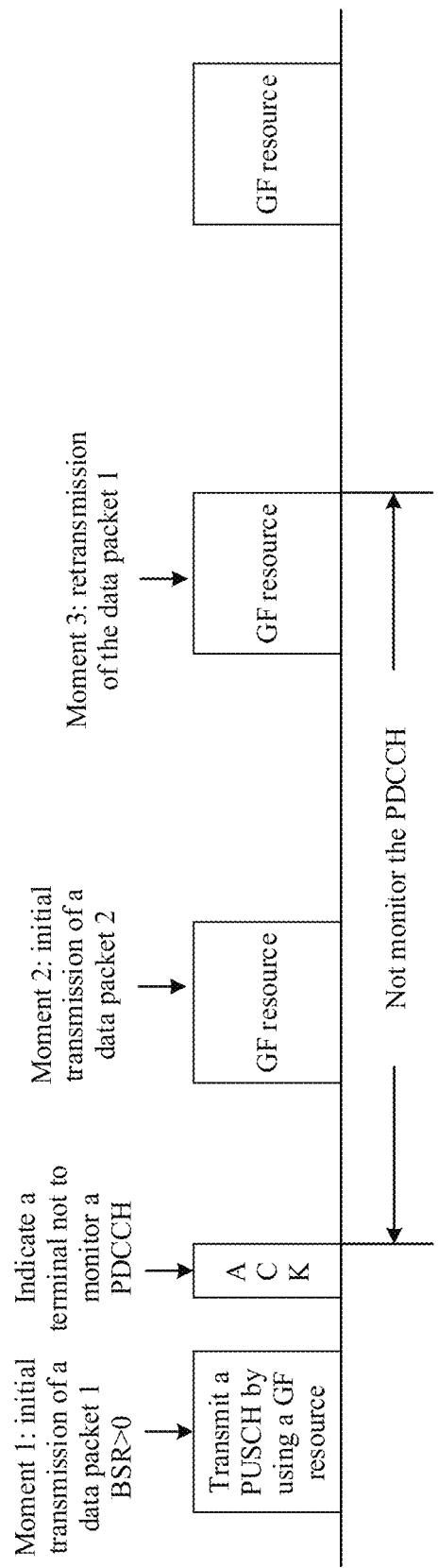
FIG. 9 is a schematic diagram of another data transmission method in a scenario in which a configured condition is: in M times of uplink transmission according to an embodiment of this application.

As shown in FIG. 9, first uplink data is represented by a data packet 1, second uplink data is data transmitted after the first uplink data, and may be retransmitted data of the data packet 1, or may be newly transmitted data. The newly transmitted data is represented by a data packet 2.

A terminal sends the initially transmitted data packet 1 by using a grant-free GF resource at a moment 1. A network device correctly receives the data packet 1 sent by the terminal by using the grant-free resource at the moment 1. The network device sends response information of the data packet 1 to the terminal, where the response information is used to indicate that the data packet 1 is correctly/successfully received, and is further used to indicate the terminal not to monitor a PDCCH in M times (namely, two times) of uplink data transmission, and indicate the terminal to transmit uplink data in a non-dynamic scheduling manner. For example, if the foregoing first possible implementation is used, the response information includes first indication information and second indication information. The first indication information is an ACK and is used to indicate that the data packet 1 is successfully received. The second indication information is used to indicate the terminal to transmit the uplink data in the non-dynamic scheduling manner in the M times (namely, two times) of uplink data transmission. If the foregoing second possible implementation is used, the response information includes an ACK, the ACK is used to indicate that the data packet 1 is successfully received, and the ACK is further used to indicate the terminal to transmit the uplink data in the non-dynamic scheduling manner in the M times (namely, two times) of uplink data transmission. The terminal receives the response information and transmits the uplink data in the non-dynamic scheduling manner in the M times (namely, two times) of uplink data transmission. The terminal transmits the uplink data on non-dynamically scheduled GF resources in the next two periodicities in the M times (namely, two times) of uplink data transmission. For example, a periodicity next to the moment 1 is a moment 2, and a periodicity next to the moment 2 is a moment 3. The initially transmitted data of the data packet 2 is transmitted on a GF resource at the moment 2, and the retransmitted data of the data packet 1 is transmitted on a GF resource at the moment 3.

FIG. 8 and FIG. 9 are two examples. During actual application, there may be other possible implementations. For example, based on the example shown in FIG. 8, the response information received by the terminal from the network device is used to indicate that the data packet 1 is not successfully received, and is used to indicate not to monitor the PDCCH in the M times of uplink data transmission and indicate to transmit the uplink data twice in the non-dynamic scheduling manner. For another example, based on the example shown in FIG. 9, the response information received by the terminal from the network device is used to indicate that the data packet 1 is successfully received, and is used to indicate to monitor the PDCCH in the M times of uplink data transmission and to transmit the uplink data twice on the uplink resource indicated by the DCI.

Based on a same technical concept, an embodiment of this application further provides a data transmission method, to determine an appropriate random access manner for a terminal. The random access mode includes 4-step random access and 2-step random access.

A conventional 4-step random access process includes the following four steps.

Step 1: A terminal sends a random access preamble sequence, referred to as a message 1 (Msg1), to a network device.

Step 2: After detecting Msg1 sent by the terminal, the network device feeds back a random access response (RAR) to the terminal, referred to as Msg2, where the RAR carries scheduling information used to schedule uplink data transmission of the terminal.

Step 3: The terminal receives Msg2, and sends a random access request, referred to as Msg3, to the network device based on an indication of the scheduling information.

Step 4: After receiving Msg3 sent by the terminal, a base station sends the terminal information, referred to as Msg4, used to indicate a contention resolution result.

For some communication scenarios such as machine type communication (MTC) and narrowband Internet of Things (NB-IoT), data transmission is characterized by a small amount of data and uncertain data arrival time. If a small data packet with a small amount of data is transmitted after random access is completed according to the conventional 4-step random access method, utilization of radio resources is reduced, a large quantity of resources are used for an RRC connection establishment procedure, and a small quantity of resources are used for data transmission. On the other hand, in this method, power consumption of the terminal is excessively high, and a downlink data delay requirement cannot be met.

To reduce terminal power consumption and reduce a random access delay of the terminal, NR also supports 2-step random access. The 2-step random access may also be referred to as EDT. The 2-step random access process is described below.

Step 1: A terminal sends a message A (MsgA) to a network device.

MsgA includes a random access preamble sequence and uplink data. The step in which the terminal sends MsgA to the network device may include: The terminal sends the random access preamble sequence to the network device through a physical random access channel (PRACH), and sends the uplink data to a base station through a PUSCH. The PRACH and the PUSCH may be consecutive or inconsecutive in time. The terminal does not monitor, between a time point of sending the random access preamble sequence and a time point of sending the uplink data, feedback information/response information of the network device for the random access preamble sequence sent by the terminal.

Step 2: After receiving MsgA, the network device sends feedback information, referred to as MsgB, of MsgA to the terminal.

MsgB may include a feedback on whether MsgA is correctly received, and may further include information used to indicate a contention resolution result.

Compared with the 4-step random access, the 2-step random access may reduce an access delay and signaling overheads. However, generally, the 2-step random access has a higher requirement on a channel environment between the terminal and the network device. If the network device configures the terminal to use only the 4-step random access, the access delay of the terminal is affected. If the network device configures the terminal to use only the 2-step random access, reliability and a success rate of random access of the terminal are affected when a channel environment is poor. In a possible implementation, the terminal may measure a channel environment before random access, and determine a random access manner based on a measurement result. However, this implementation brings extra power consumption to the terminal due to measurement, and this is infeasible for a terminal having a low power consumption requirement.

Figure 10:
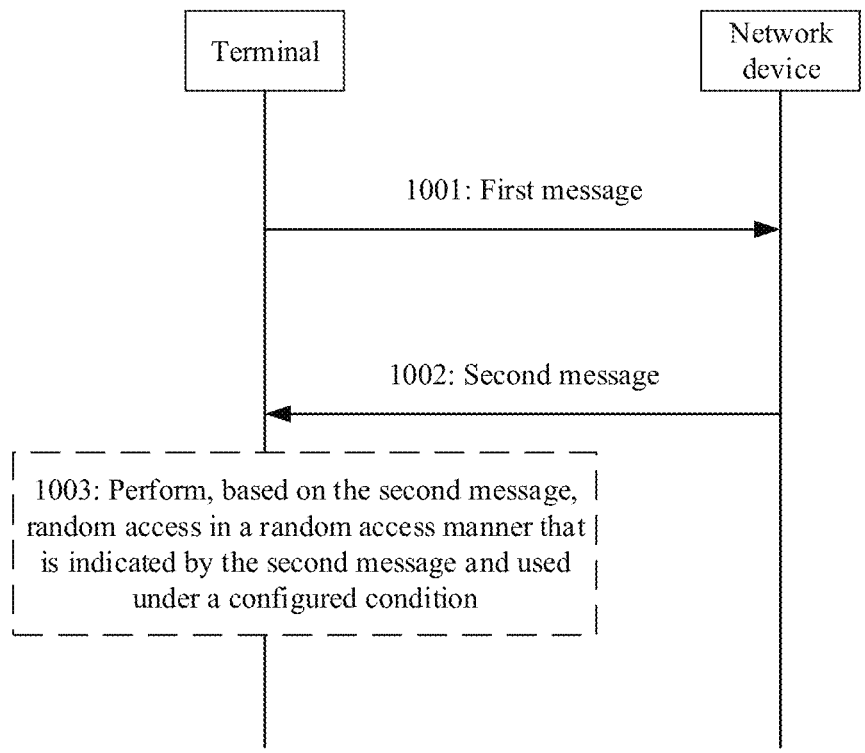
FIG. 10 is a schematic flowchart 2 of a data transmission method according to an embodiment of this application.

According to the data transmission method provided in this embodiment of this application, an appropriate random access manner can be determined for the terminal, to give consideration to dual effects of low delay and power consumption and high reliability. As shown in FIG. 10, a procedure of the data transmission method is as follows.

S1001: A terminal sends a first message to a network device, and the network device receives the first message from the terminal.

S1002: The network device sends a second message to the terminal based on the first message, and the terminal receives the second message from the network device, where the second message is used to indicate the terminal to use a random access manner under a configured condition.

S1003: The terminal performs, based on the second message, random access in the random access manner that is indicated by the second message and used under the configured condition.

In a scenario, if 4-step random access is used when the terminal sends the first message, the first message is Msg1 in the 4-step random access. The second message is Msg2 or Msg4 in the 4-step random access. If Msg2 indicates the terminal to use the 4-step random access under the configured condition, after receiving Msg2, the terminal continues to use the 4-step random access under the configured condition based on an indication of Msg2. If Msg4 indicates the terminal to use the 4-step random access under the configured condition, after receiving Msg4, the terminal continues to use the 4-step random access under the configured condition based on an indication of Msg4. If Msg2 indicates the terminal to use 2-step random access under the configured condition, after receiving Msg2, the terminal may use the 2-step random access under the configured condition based on an indication of Msg2 after completing step 3 and step 4 in the current 4-step random access; or after receiving Msg2, the terminal may not continue to perform step 3 and step 4 in the current 4-step random access, and may directly use the 2-step random access under the configured condition based on an indication of Msg2. If Msg4 indicates the terminal to use 2-step random access under the configured condition, after receiving Msg4, the terminal uses the 2-step random access under the configured condition based on an indication of Msg4.

In another scenario, if 2-step random access is used when the terminal sends the first message, the first message is MsgA in the 2-step random access process. The second message is MsgB in the 2-step random access. If MsgB indicates the terminal to use 4-step random access under the configured condition, after receiving MsgB, the terminal uses the 4-step random access under the configured condition based on an indication of MsgB. If MsgB indicates the terminal to use 2-step random access under the configured condition, after receiving MsgB, the terminal uses the 2-step random access under the configured condition based on an indication of MsgB.

For the configured condition in this method embodiment, refer to the foregoing description of the configured condition. For example, the configured condition may be: in a time window or in specific duration. In this case, the terminal performs, based on the second message, random access in a random access manner that is indicated by the second message and used in the time window. For an indication manner of the time window and a manner of timing the time window by the terminal, refer to the foregoing related descriptions. Details are not described herein again.

For another example, the configured condition may be: in M times of random access. In this case, the terminal performs, based on the second message, random access in a random access manner that is indicated by the second message and that is used in the M times of random access. For a manner in which the terminal counts the M times, refer to the foregoing related descriptions. Details are not described herein again.

It should be noted that examples in the application scenarios in this application merely show some possible implementations, to help better understand and describe the method in this application. Persons skilled in the art may obtain examples of some evolution forms according to the data transmission method provided in this application.

In embodiments of this application, expressions such as "receiving from the network device" and "sending to the network device" are not limited to directly receiving and sending a radio frequency signal, but merely describe an original source or a final destination of the information/message/data, which may also be processed by other devices or devices during transmission.

In the foregoing embodiments provided in this application, the method provided in embodiments of this application is separately described from perspectives of the network device, the terminal, and interaction between the network device and the terminal. To implement functions in the foregoing methods provided in embodiments of this application, the network device and the terminal may include a hardware structure and/or a software module, and implement the foregoing functions in a form of the hardware structure, the software module, or a combination of the hardware structure and the software module. Whether a function of the foregoing functions is performed by using the hardware structure, the software module, or the combination of the hardware structure and the software module depends on a specific application and a design constraint condition of the technical solution.

Figure 11:
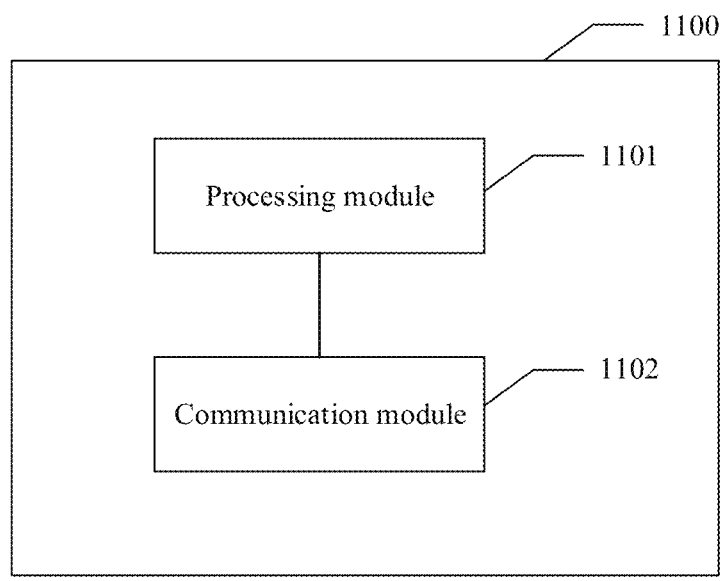
FIG. 11 is a schematic diagram of a structure of an apparatus according to an embodiment of this application.

As shown in FIG. 11, based on a same technical concept, an embodiment of this application further provides an apparatus 1100. The apparatus 1100 may be a terminal or a network device, may be an apparatus in the terminal or the network device, or may be an apparatus that can be used in cooperation with the terminal or the network device. In a design, the apparatus 1100 may include modules that are in a one-to-one correspondence with the methods/operations/steps/actions performed by the terminal or the network device in the foregoing method embodiments. The modules may be implemented by a hardware circuit, software, or a combination of a hardware circuit and software. In a design, the apparatus may include a processing module 1101 and a communication module 1102. The processing module 1101 is configured to invoke the communication module 1102 to perform a receiving function and/or a sending function.

When the apparatus is configured to perform the method performed by the terminal, the communication module 1102 is configured to: transmit first uplink data to a network device on a non-dynamically scheduled resource; and receive response information for first uplink data from the network device, where the response information is used to indicate whether the first uplink data is successfully received; and the processing module 1101 is configured to: determine, based on the response information, to monitor a physical downlink control channel (PDCCH) under a configured condition, where the PDCCH is used to schedule uplink data transmission; or the processing module 1101 is configured to determine, based on the response information, to transmit second uplink data by using the non-dynamically scheduled resource under a configured condition.

When the apparatus is configured to perform the method performed by the network device, the communication module 1102 is configured to: receive first uplink data from a terminal; and send response information for the first uplink data to the terminal, where the response information is used to indicate whether the first uplink data is successfully received, and is used to indicate an uplink transmission manner, where the uplink transmission manner includes dynamic scheduling-based uplink transmission under a configured condition or transmitting second uplink data by using a non-dynamically scheduled resource under the configured condition.

The processing module 1101 and the communication module 1102 may be further configured to perform another corresponding step or operation performed by the terminal or the network device in the foregoing method embodiments. Details are not described herein again.

In embodiments of this application, division of modules is an example, and is merely logical function division. In an actual implementation, there may be another division manner. In addition, function modules in embodiments of this application may be integrated into one processor, or each of the modules may exist alone physically, or two or more modules may be integrated into one module. The foregoing integrated module may be implemented in a form of hardware, or may be implemented in a form of a software function module.

Figure 12:
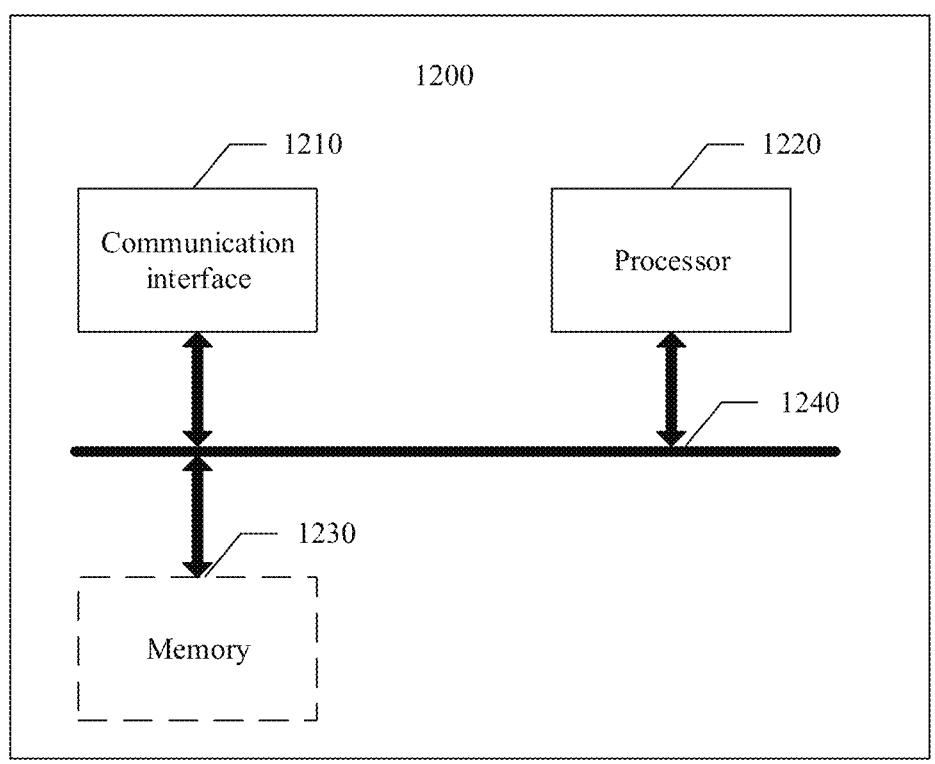
FIG. 12 is a schematic diagram of a structure of another apparatus according to an embodiment of this application.

FIG. 12 shows an apparatus 1200 according to an embodiment of this application. The apparatus 1200 is configured to implement a function of the terminal or the network device in the foregoing method. When the function of the network device is implemented, the apparatus may be a network device, an apparatus in the network device, or an apparatus that can be used in cooperation with the network device. When the function of the terminal is implemented, the apparatus may be a terminal, an apparatus in the terminal, or an apparatus that can be used in cooperation with the terminal. The apparatus may be a chip system. In this embodiment of this application, the chip system may include a chip, or may include a chip and another discrete component. The apparatus 1200 includes at least one processor 1220, configured to implement a function of the terminal or the network device in the method provided in embodiments of this application. The apparatus 1200 may further include a communication interface 1210. In this embodiment of this application, the communication interface may be a transceiver, a circuit, a bus, a module, or a communication interface of another type, and is configured to communicate with another device by using a transmission medium. For example, the communication interface 1210 is used by an apparatus in the apparatus 1200 to communicate with another device. For example, when the apparatus 1200 is a network device, the another device may be a terminal. When the apparatus 1200 is a terminal device, the another apparatus may be a network device. The processor 1220 receives and sends data through the communication interface 1210, and is configured to implement the method in the foregoing method embodiments. For example, when a function of the network device is implemented, the processor 1220 is configured to: receive first uplink data from a terminal through the communication interface; and send response information for the first uplink data to the terminal, where the response information is used to indicate whether the first uplink data is successfully received, and is used to indicate an uplink transmission manner, where the uplink transmission manner includes dynamic scheduling-based uplink transmission under a configured condition or transmitting second uplink data by using a non-dynamically scheduled resource under the configured condition. For example, when a function of the network device is implemented, the processor 1220 is configured to: transmit first uplink data to the network device on a non-dynamically scheduled resource through the communication interface 1210; and receive response information for the first uplink data from the network device, where the response information is used to indicate whether the first uplink data is successfully received. The processor 1220 is configured to: determine, based on the response information, to monitor a physical downlink control channel (PDCCH) under the configured condition, where the PDCCH is used to schedule uplink data transmission; or determine, based on the response information, to transmit second uplink data by using a non-dynamically scheduled resource under the configured condition. The processor 1220 and the communication interface 1210 may be further configured to perform another corresponding step or operation performed by the terminal or the network device in the foregoing method embodiments. Details are not described herein again.

The apparatus 1200 may further include at least one memory 1230, configured to store a program instruction and/or data. The memory 1330 is coupled to the processor 1220. Coupling in embodiments of this application is an indirect coupling or a communication connection between apparatuses, units, or modules, may be in an electrical, a mechanical, or another form, and is used for information exchange between the apparatuses, the units, or the modules. The processor 1220 may operate with the memory 1230. The processor 1220 may execute the program instructions stored in the memory 1230. At least one of the at least one memory may be included in the processor.

This embodiment of this application does not limit a specific connection medium between the communications interface 1210, the processor 1220, and the memory 1230. In this embodiment of this application, the memory 1230, communication interface 1220, and the communication interface 1210 are connected to each other by using a bus 1240 in FIG. 12. The bus is represented by using a thick line in FIG. 12, and a connection manner between other components is merely described as an example, and is not limited thereto. The bus may be classified into an address bus, a data bus, a control bus, and the like. For ease of representation, only one thick line is used to represent the bus in FIG. 12, but this does not mean that there is only one bus or only one type of bus.

When the apparatus 1100 and the apparatus 1200 are specifically chips or chip systems, the communication module 1102 and the communication interface 1210 may output or receive a baseband signal. When the apparatus 1100 and the apparatus 1200 are specifically devices, the communication module 1102 and the communication interface 1210 may output or receive a radio frequency signal. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly presented as being performed and completed by a hardware processor, or performed and completed by a combination of hardware and a software module in a processor.

In this embodiment of this application, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store the program instructions and/or the data.

An embodiment of this application further provides a computer-readable medium, where the computer-readable medium stores a computer program. When the computer program is executed on an apparatus, the apparatus is enabled to implement the method in the foregoing method embodiments.

An embodiment of this application further provides a computer program product. When the computer program product is executed on an apparatus, the apparatus is enabled to implement the method in the foregoing method embodiments.

Persons skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some preferred embodiments of this application are described, persons skilled in the art may make changes and modifications to embodiments once they learn the basic inventive concept. Therefore, the following claims are intended to be construed as to cover the preferred embodiments and all changes and modifications falling in the scope of this application.

Certainly, persons skilled in the art may make various modifications and variations to embodiments of this application without departing from the spirit and scope of embodiments of this application. This application is intended to cover the modifications and variations provided that they fall in the scope of protection defined by the following claims and their equivalent technologies.

What is claimed is:

1. A data transmission method, comprising:
   transmitting, by a communication apparatus, first uplink data to a network device on a non-dynamically scheduled resource;
   receiving, by the communication apparatus, response information for the first uplink data from the network device, wherein the response information is used to indicate whether the first uplink data is successfully received; and
   determining, by the communication apparatus based on the response information, whether to monitor a physical downlink control channel (PDCCH) under a configured condition, wherein the PDCCH is used to schedule uplink data transmission; and
   based on a determination being made not to monitor the PDCCH under the configured condition, determining, by the communication apparatus based on the response information, to transmit second uplink data using the non-dynamically scheduled resource under the configured condition.

2. The method according to claim 1, wherein the determining, by the communication apparatus based on the response information, to monitor a physical downlink control channel PDCCH under a configured condition comprises:
   determining, by the communication apparatus based on the response information, to monitor the PDCCH in a time window; or
   the determining, by the communication apparatus based on the response information, to transmit second uplink data by using the non-dynamically scheduled resource under a configured condition comprises:
      determining, by the communication apparatus based on the response information, to transmit the second uplink data by using the non-dynamically scheduled resource in the time window.

3. The method according to claim 2, the method further comprising:
   starting or restarting, by the communication apparatus, a timer in response to the response information, wherein timer duration of the timer is a length of the time window; and
   based on the response information being used to indicate to monitor the PDCCH, monitoring, by the communication apparatus, the PDCCH during running of the timer; or
   based on the response information being used to indicate to transmit the second uplink data in a non-dynamic scheduling manner, transmitting, by the communication apparatus, the second uplink data in the non-dynamic scheduling manner during running of the timer.

4. The method according to claim 1, wherein the determining, by the communication apparatus based on the response information, to monitor a physical downlink control channel PDCCH under a configured condition comprises:
   determining, by the communication apparatus based on the response information, to monitor the physical downlink control channel PDCCH before each of M times of uplink data transmission; or
   the determining, by the communication apparatus based on the response information, to transmit second uplink data by using the non-dynamically scheduled resource under a configured condition comprises:
      determining, by the communication apparatus based on the response information, to perform M times of uplink data transmission by using the non-dynamically scheduled resource.

5. The method according to claim 4, the method further comprising:
   starting or restarting, by the communication apparatus, a counter in response to the response information; and
   based on the response information indicating to monitor the PDCCH, monitoring, by the communication apparatus, the PDCCH before a quantity of times recorded by the counter exceeds M; or
   based on the response information being used to indicate to transmit the second uplink data in a non-dynamic scheduling manner, transmitting, by the communication apparatus, the second uplink data in the non-dynamic scheduling manner.

6. The method according to claim 1, wherein:
   the response information comprises first indication information and second indication information, the first indication information is used to indicate whether the first uplink data is successfully received; and
   the second indication information is used to indicate to monitor the PDCCH under the configured condition or indicate to transmit the second uplink data in the non-dynamic scheduling manner under the configured condition.

7. The method according to claim 1, wherein the response information comprises:
   a positive acknowledgment instruction (ACK), and the ACK is used to indicate that the first uplink data is successfully received and indicate to transmit the second uplink data in the non-dynamic scheduling manner under the configured condition; or
   a negative acknowledgment instruction (NACK), and the NACK is used to indicate that the first uplink data is not successfully received and indicate to monitor the PDCCH under the configured condition.

8. The method according to claim 1, the method further comprising:
   sending, by the communication apparatus, a buffer status report (BSR) to the network device, wherein the BSR indicates that the terminal buffers data.

9. A data transmission method, the method comprising:
   receiving, by a network device, first uplink data from a communication apparatus; and
   sending, by the network device, response information for the first uplink data to the terminal, wherein the response information is used to indicate whether the first uplink data is successfully received, and is used to indicate an uplink transmission manner, and wherein the uplink transmission manner comprises one of either dynamic scheduling-based uplink transmission under a configured condition or transmitting second uplink data using a non-dynamically scheduled resource under the configured condition, wherein the response information comprises first indication information and second indication information, wherein the first indication information is used to indicate whether the first uplink data is successfully received, and the second indication information is used to indicate to monitor a physical downlink control channel (PDCCH) under the configured condition or indicate to transmit the second uplink data in a non-dynamic scheduling manner under the configured condition.

10. The method according to claim 9, wherein:
the uplink transmission manner comprises dynamic scheduling-based uplink transmission in a time window; or
transmitting the second uplink data by using the non-dynamically scheduled resource in the time window.

11. The method according to claim 9, wherein:
the uplink transmission manner comprises monitoring the PDCCH before each of M times of uplink data transmission; or
performing M times of uplink transmission by using the non-dynamically scheduled resource.

12. The method according to claim 9, wherein:
the response information comprises a positive acknowledgment instruction (ACK), and the ACK is used to indicate that the first uplink data is successfully received and indicate to transmit the second uplink data in a non-dynamic scheduling manner under the configured condition; or
the response information comprises a negative acknowledgment instruction (NACK), and the NACK is used to indicate that the first uplink data is not successfully received and indicate to monitor the PDCCH under the configured condition.

13. The method according to claim 9, the method further comprising:
receiving, by the network device, a buffer status report (BSR) from the communication apparatus, wherein the BSR indicates that the terminal buffers data.

14. An apparatus, comprising:
a transceiver configured to transmit first uplink data to a network device on a non-dynamically scheduled resource;
receive response information for the first uplink data from the network device, wherein the response information is used to indicate whether the first uplink data is successfully received; and
a processor configured to determine, based on the response information, whether to monitor a physical downlink control channel (PDCCH) under a configured condition, wherein the PDCCH is used to schedule uplink data transmission; and
based on a determination being made not to monitor the PDCCH under the configured condition, determine, based on the response information, to transmit second uplink data using the non-dynamically scheduled resource under the configured condition.

15. The apparatus according to claim 14, wherein the processor is further configured to:
determine, based on the response information, to monitor the PDCCH in a time window; or
determine, based on the response information, to transmit the second uplink data by using the non-dynamically scheduled resource in the time window.

16. The apparatus according claim 15, wherein the processor is further configured to:
start or restart a timer in response to the response information, wherein timer duration of the timer is a length of the time window; and
in response to the response information being used to indicate to monitor the PDCCH, the processor is further configured to monitor the PDCCH during running of the timer; or
in response to the response information being used to indicate to transmit the second uplink data in a non-dynamic scheduling manner, the processor is further configured to transmit the second uplink data in the non-dynamic scheduling manner during running of the timer.

17. The apparatus according to claim 14, wherein:
the processor is further configured to determine, based on the response information, to monitor the physical downlink control channel (PDCCH) before each of M times of uplink data transmission; or
the processor is further configured to determine, based on the response information, to perform M times of uplink data transmission by using the non-dynamically scheduled resource.

18. The apparatus according to claim 17, wherein the processor is further configured to:
start or restart a counter in response to the response information; and
in response to the response information is used to indicate to monitor the PDCCH, the processor is further configured to monitor the PDCCH before a quantity of times recorded by the counter exceeds M; or
in response to the response information is used to indicate to transmit the second uplink data in a non-dynamic scheduling manner, the processor is further configured to transmit the second uplink data in the non-dynamic scheduling manner.

19. The apparatus according to claim 14, wherein the response information comprises:
first indication information and second indication information, wherein the first indication information is used to indicate whether the first uplink data is successfully received, and wherein the second indication information is used to indicate to monitor the PDCCH under the configured condition or indicate to transmit the second uplink data in the non-dynamic scheduling manner under the configured condition.

* * * * *